(12) United States Patent
Estrop

(10) Patent No.: US 7,139,002 B2
(45) Date of Patent: Nov. 21, 2006

(54) BANDWIDTH-EFFICIENT PROCESSING OF VIDEO IMAGES

(75) Inventor: Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/694,144

(22) Filed: Oct. 27, 2003

(65) Prior Publication Data

US 2005/0024363 A1     Feb. 3, 2005

Related U.S. Application Data

(60) Provisional application No. 60/492,029, filed on Aug. 1, 2003.

(51) Int. Cl.
G06F 15/00    (2006.01)
G09G 5/399   (2006.01)
G09G 5/00     (2006.01)

(52) U.S. Cl. .................. 345/501; 345/540; 345/581

(58) Field of Classification Search ............. 345/542, 345/522, 501–506, 582, 540, 581, 591
See application file for complete search history.

(56) References Cited

U.S. PATENT DOCUMENTS

| | | |
|---|---|---|
| 4,463,372 A | 7/1984 | Bennett et al. |
| 4,639,763 A | 1/1987 | Willis et al. |
| 4,866,637 A | 9/1989 | Gonzalez-Lopez et al. |
| 5,235,432 A | 8/1993 | Creedon et al. |
| 5,508,812 A | 4/1996 | Stevenson et al. |
| 5,715,459 A | 2/1998 | Celi, Jr. et al. |
| 5,742,797 A | 4/1998 | Celi, Jr. et al. |
| 5,757,386 A | 5/1998 | Celi, Jr. et al. |
| 5,872,956 A | 2/1999 | Beal et al. |
| 5,936,632 A | 8/1999 | Cunniff et al. |
| 5,940,141 A | 8/1999 | Faroudja et al. |
| 5,982,453 A | 11/1999 | Willis |
| 6,034,733 A | 3/2000 | Balram et al. |
| 6,047,295 A | 4/2000 | Endicott et al. |
| 6,144,390 A | 11/2000 | Ensor |
| 6,208,350 B1 * | 3/2001 | Herrera ..................... 345/582 |
| 6,212,574 B1 | 4/2001 | O'Rourke et al. |
| 6,262,773 B1 | 7/2001 | Westerman |

(Continued)

FOREIGN PATENT DOCUMENTS

EP          0600204          6/1994

(Continued)

OTHER PUBLICATIONS

"YUV," available at <http://en.wikipedia.org/wiki/YUV>.*

(Continued)

*Primary Examiner*—Kee M. Tung
*Assistant Examiner*—Joni Hsu
(74) *Attorney, Agent, or Firm*—Lee & Hayes, PLLC

(57) ABSTRACT

A technique is described for performing multiple video processing tasks in a single operation, as opposed to serially. For instance, a technique is described for de-interlacing a principal video stream at the same time that at least one video sub-stream is combined with the principal video stream. Performing these tasks in a single call to a graphics processing unit, as opposed to staggered serial calls, reduces the bandwidth requirements of the processing operations. This, in turn, can enable a computing device to perform these multiple operations at full frame rate. In one implementation, different texturing units are respectively assigned to the principal video stream and the video sub-stream. The graphics processing unit interacts with these texturing units and associated memory locations substantially in parallel, thus providing the above-described bandwidth savings.

31 Claims, 14 Drawing Sheets

U.S. PATENT DOCUMENTS

| | | | |
|---|---|---|---|
| 6,269,484 | B1 | 7/2001 | Simsic et al. |
| 6,295,068 | B1 | 9/2001 | Peddada et al. |
| 6,307,559 | B1 | 10/2001 | Hancock et al. |
| 6,317,165 | B1 | 11/2001 | Balram et al. |
| 6,323,875 | B1 | 11/2001 | Millman et al. |
| 6,331,874 | B1 | 12/2001 | de Garrido et al. |
| 6,369,855 | B1 | 4/2002 | Chauvel et al. |
| 6,370,198 | B1 | 4/2002 | Washino |
| 6,466,226 | B1* | 10/2002 | Watson et al. ............... 345/610 |
| 6,509,930 | B1 | 1/2003 | Hirano et al. |
| 6,573,905 | B1* | 6/2003 | MacInnis et al. ........... 345/629 |
| 6,611,269 | B1* | 8/2003 | Uehara et al. ............... 345/522 |
| 6,753,878 | B1* | 6/2004 | Heirich et al. ............... 345/629 |
| 6,788,312 | B1 | 9/2004 | Azar et al. |
| 6,833,837 | B1 | 12/2004 | Hei La |
| 6,928,196 | B1 | 8/2005 | Bradley et al. |
| 6,940,557 | B1 | 9/2005 | Handjojo et al. |
| 2002/0063801 | A1 | 5/2002 | Richardson |
| 2002/0145610 | A1 | 10/2002 | Barilovits et al. |
| 2004/0032906 | A1* | 2/2004 | Lillig .................... 375/240.08 |
| 2004/0054689 | A1* | 3/2004 | Salmonsen et al. ...... 707/104.1 |

FOREIGN PATENT DOCUMENTS

| | | |
|---|---|---|
| WO | WO 01/61992 | 8/2001 |
| WO | WO 02/067577 | 8/2002 |

OTHER PUBLICATIONS

"GPU: Changes Everything," available at http://www.nvidia.com/object/gpu.html>.*

Stephen Mann, "The Graphics Rendering Pipeline," 1997, available at <http://medialab.di.unipi.it/web/IUM/Waterloo/node7.html>.*

"Parallel Processing," available at <http://www.google.com/search?hl=en&lr=&oi=defmore&q=define:parallel+processing>.*

"Parallel Processing," available at http://www.google.com/search?hl=en&lr=&oi=defmore&q=define:parallel+processing.*

"YUV," available at http://en.wikipedia.org/wiki/YUV.*

"GPU: Changes Everything," available at http://www.nvidia.com/object/gpu.html.*

Stephen Mann, "The Graphics Rendering Pipeline," 1997, available at http://medialab.di.unipi.it/web/IUM/Waterloo/node7.html. □□□□"Texture mapping," availabe at http://en.wikipedia.org/wiki/Texture_mapping.*

Wolfgang F. Engel, Direct3D ShaderX: Vertex and Pixel Shader Tips and Tricks, Wordware Publishing, Inc., 2002, pp. 72-124.

Michael Blome, "Introducing Some New Video Mixing Renderer Sample Applications," dated Apr. 2003, twenty pages, available at <http://msdn.microsoft.com/library/default.asp?url=/library/en-us/dnwmt/html/introducingsomenewvideomixingrenderersampleapplica.asp>.

Yahya H. Mirza and Henry da Costa, "DirectX 9.0: Introducing the New Managed3D Graphics API in the .NET Framework," from the Apr. 2003 issue of MSDN Magazine, ten pages, available at <http://msdn.microsoft.com/library/default.asp?url=/msdnmag/issues/03/07/DirectX90/toc.asp>.

Introductory page entitled "Deinterlacing and Frame-Rate Conversion," MSDN Library technical literature, accessed on Feb. 3, 2003, one page, available at <http://msdn.microsoft.com/library/default.asp?url=/library/en-us/graphics/hh/graphics/dxvaguide_0t2f.asp>.

Birn, Jeremy, "Digital Lighting & Rendering," 2001, available at <http://www.3drender.com/glossary/fields.htm>, 2 pages.

Marjanovic, Matthew, "Chroma Subsampling Standards," Mar. 31, 2003, available at <http://www.mir.com/DMG/chroma.html>, 5 pages.

Foreign Search Report for EP 03 00 5836, dated Dec. 15, 2004, 3 pages.

Foreign Search Report for EP 03 008706, dated Dec. 15, 2004, 3 pages.

U.S. Appl. No. 10/273,505, filed Oct. 18, 2002, entitled "Methods and Apparatuses for Facilitating Processing of Interlaced Video Images for Progressive Video Displays," Stephen Estrop, 73 pages.

U.S. Appl. No. 10/400,040, filed Mar. 25, 2003, entitled "Facilitating Interaction between Video Renderers and Graphics Device Drivers," Stephen Estrop, 85 pages.

U.S. Appl. No. 10/987,378, filed Nov. 12, 2004, entitled "Image Processing Using Linear Light Values and Other Image Processing Improvements," Munsil et al., 95 pages.

U.S. Appl. No. 10/902,325, filed Jul. 29, 2004, entitled "Strategies for Processing Image Information Using a Color Information Data Structure," Evans et al., 94 pages.

Charles Poynton, *Digital Video and HDTV; Algorithms and Interfaces,* Morgan Kaufmann Publishers, 2003, table of contents, pp. xi to xxiii, and chapter 24, pp. 281-300.

David Union, "Accessing Device Drivers from C#," Windows Developer Magazine, available at <www.wd-mag.com>, vol. 13, No. 4, Apr. 2002, pp. 19, 20, 22, 23, 26, 27.

Hui Xin-biao, Dong Yong-qiang, Qi Dan-qing, "Implementation of MPEG stream analyzer," Journal of China Institute of Communications, vol. 22, No. 10, Oct. 2001, pp. 57-62.

He Yong-yi, Xia Jun-sheng, Fang Ming-lun, "Development and Application of the NT Device Driver in CNC System," Journal of Shanghai University (English Edition), ISSN 1007-6417, vol. 5, No. 4 (Dec. 2001), pp. 317-321.

Mark G. Rawlins, "A Standards Solution to Your Graphics Problems," Graphic Software Systems, Inc., Frontiers in Computer Graphics, Proceedings of Computer Graphics Tokyo '84, copyright by Springer-Verlag Tokyo 1985, pp. 375-416.

Adrian Ford and Alan Roberts, "Colour Space Conversions," dated Aug. 11, 1998, available at <http://www.poynton.com/PDFs/coloureq.pdf>, accessed on Jul. 28, 2004, 31 pages.

Charles Poynton, "Frequently Asked Questions about Gamma," 1998, available at <http://www.poynton.com/PDFs/GammaFAQ.pdf>, accessed on Jul. 28, 2004, 12 pages.

Charles Poynton, "Frequently Asked Questions about Color," 1997, available at <http://www.poynton.com/PDFs/ColorFAQ.pdf>, accessed on Jul. 28, 2004, 24 pages.

Patent Abstracts of Japan, Publication No. 2000311240, vol. 2000, No. 14, Publication date Nov. 7, 2000.

Patent Abstracts of Japan, Publication No. 2001084154, vol. 2000, No. 20, Publication date Mar. 30, 2001.

Don Musil and Stacey Spears, "The Chroma Upsampling Error and the 4:2:0 Interlaced Chroma Problem," Secrets of Home Theater and High Fidelity, DVD Benchmark, accessible at <<http://www.hometheaterhifi.com/volume_8_2/dvd-benchmark-special-report-chroma-bug-4-2001.html>>, Apr. 2001, Dec. 2002, Jan. 2003, 20 pages.

"YCbCr to RGB Considerations," Intersil Application Note, AN9717, Mar. 1997, available at <<http://www.Intersil.com/data/an/an9717.pdf>>, 2 pages.

"Understanding Analog Video Signals," Dallas Maxim, Application Note 1184, available at <<http://www.maxim-ic.com/appnotes.cfm/appnote_number/1184>>, Sep. 4, 2002, 12 pages.

Introductory page entitled "An Introduction to QuickTimeTM," available at <<http://developer.apple.com/quicktime/qttutorial/overview.html>>, accessed on Jan. 13, 2005, 2 pages.

\* cited by examiner

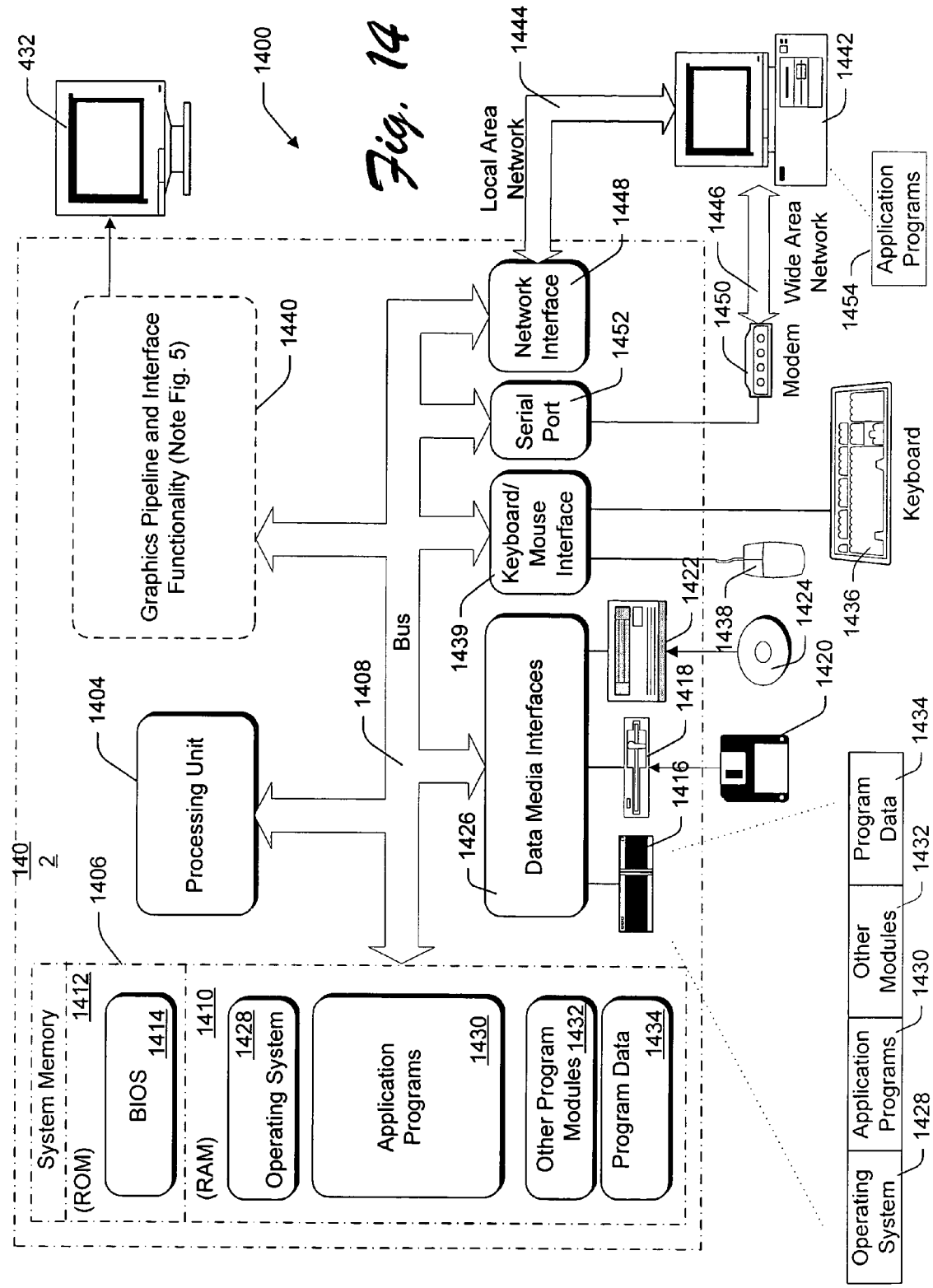

BANDWIDTH-EFFICIENT PROCESSING OF VIDEO IMAGES

This application claims the benefit of U.S. Provisional Application No. 60/492,029, filed on Aug. 1, 2003, and incorporated by reference herein in its entirety.

TECHNICAL FIELD

This subject matter relates to the rendering of video data in a bandwidth-efficient manner, and, in a more particular implementation, to the de-interlacing of video data in a bandwidth-efficient manner.

BACKGROUND

Video image sequences can be represented using two different techniques: progressive and interlaced techniques. With progressive video, all of the picture elements comprising a frame of a video image are sampled at the same time (where a "frame" refers to one video image snapshot within the sequence of video images). With interlaced video, alternate lines of the video image are sampled at alternate moments in time. Capturing the video image using the interlaced video technique results in the creation of two half-frames, referred to as "fields," which together constitute a single frame in the video sequence. For instance, note FIG. 1. A first field 102 is commonly referred to as a top field or even field. A second field 104 is commonly referred to as a bottom field or odd field. These two fields (102, 104) together constitute a single frame 106 in a video sequence. Video devices in the United States commonly present video sequences at a frame rate of 29.97 frames per second (that is, roughly 30 frames every second). Televisions and camcorders are common devices that manipulate image sequences using the interlaced technique. Computer monitors and some DVD players are common devices that manipulate image sequences using the progressive technique.

Some applications require that interlaced video image sequences be processed and displayed using a device that is configured to handle only progressive image sequences. These applications therefore require that the image sequence be converted from interlaced format to progressive format. This process is referred to as "de-interlacing." FIG. 1 illustrates the result of an exemplary de-interlacing process. In this process, the top and bottom fields (102, 104) are reassembled to form a single frame 108 in the video sequence.

A number of techniques exist in the art for de-interlacing video image sequences. However, there is room for improvement in many of these techniques, particularly for those kinds of devices that may be particularly sensitive to variations in bandwidth. More specifically, a technique for de-interlacing video image sequences will inherently require a certain amount of bandwidth as information is transferred to and from memory locations. Modern processors are generally available that can handle such a task in an efficient manner. However, in many competitive marketing environments, the success of a video processing device does not merely depend on the processing power of the device, but also depends on the cost of the device. A developer may therefore choose to forego a certain amount of processing power to provide a less expensive design. It is particularly in these circumstances that the ability to efficiently perform de-interlacing may be jeopardized.

The effectiveness of the de-interlacing operation is particularly brought into question in those cases where less powerful architectures are required to perform other processing tasks in combination with the de-interlacing operation. For instance, modern video processors often require functionality that allows for the rendering of supplemental data along with the sequence of video images. Such supplemental data may comprise close-captioning information, various graphical data associated with the presentation of DVD video sequences, PAL Teletext images, and so on. Such supplemental information is referred to as "video sub-stream" data herein, to distinguish this data from the main sequence of video images (referred to as the "video stream" data herein). It may strain the processing resources of some architectures to handle the combined tasks of de-interlacing and the rendering of video sub-stream data. Similar potential problems may be present with respect to other kinds of resource-intensive processing tasks, such as the display of high definition television (HDTV) signals.

Consider, for example, the case of a device that employs Unified Memory Architecture (UMA). In a UMA design, both the main CPU processor of the device and a graphics processing unit (GPU) share the same memory. (A GPU commonly provides a pipeline for performing a sequence of image rendering tasks, therefore alleviating some of the processing burden that would otherwise be imposed on the CPU). Allocating separate memories to the CPU and GPU will typically result in a more robust processing architecture. However, many developers opt for the UMA architecture so as to provide a less expensive design. This savings in cost can result in a higher bandwidth burden on the device, as both the CPU and GPU are now making demands on the shared memory. It is in these kinds of devices that limitations may arise that prevent video processing operations from becoming too complex. Some UMA-type devices may not be able to efficiently perform de-interlacing and the processing of video sub-stream data at the same time. This can result in the suboptimal display of video data, that is, at less that the normal frame rate. In other cases, these limitations may completely preclude the efficient rendering of video image data.

Accordingly, there is an exemplary need in the art to provide techniques for allowing devices to perform video processing without incurring the above-identified problems. There is a more specific need in the art to provide techniques for robustly handling video processing in bandwidth-challenged devices, such as UMA-type devices.

SUMMARY

According to one exemplary implementation, methods, apparatuses, and computer readable media are described for performing multiple video processing tasks in a single operation, as opposed to serially. For instance, methods, apparatuses, and computer readable media are described for de-interlacing a principal video stream at the same time that at least one video sub-stream is combined with the principal video stream. Performing these tasks in a single call to a data processing module (such as a GPU), as opposed to staggered serial calls, reduces the bandwidth requirements of the processing operation. This, in turn, can enable a computing device to perform these multiple operations at full frame rate.

In one implementation, different texturing units are assigned to the principal video stream and the video sub-stream, respectively. The graphics processing unit interacts with these texturing units and associated memory locations substantially in parallel, thus providing the above-described bandwidth savings.

The methods, apparatuses, and computer readable media described above can combine other kinds of processing tasks in a single call to the data processing module (e.g., other than de-interlacing). For example, the methods, apparatus, and computer readable media can perform resizing of the principal video stream at the same time as the sub-stream is combined with the principal video stream.

BRIEF DESCRIPTION OF THE DRAWINGS

FIG. 14 shows an exemplary computing environment for implementing the apparatus shown in FIG. 4.

Figure 1:
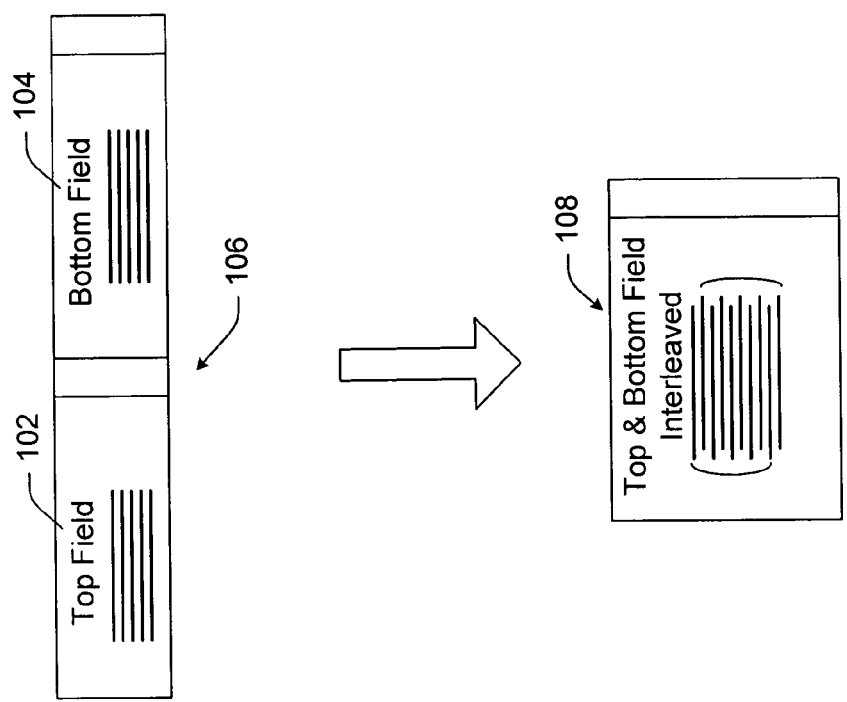
FIG. 1 shows an example of a de-interlacing operation.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to apparatuses, methods, and computer-readable media for processing a video stream. A video stream refers to a primary sequence of video frames. On the other hand, a video sub-stream refers to auxiliary video data that can be presented along with the video frames of the primary video stream. In one case, a device can be configured to automatically present the video sub-stream data in tandem with the primary video stream. In other cases, the device can be configured to render the video sub-stream data only upon the command of a user, or based on some other contingent event. For instance, a television signal may contain interlaced video fields that are supplemented by close-captioning data. This close-captioning data is only displayed when the viewer selects such a display (e.g., via remote control actuation). The close-captioning data is combined with the primary video stream to form a composite image for display.

While the ensuing discussing will emphasize the bandwidth-efficient integration of a de-interlacing operation with a video sub-stream compositing operation, the principles described herein have application to other video processing environments and applications, and other combinations of video processing operations. The video processing applications described in the following are exemplary and illustrative.

Further, the novel features of the present invention are described below as implemented on a personal computer or like device. However, the principles can also be implemented on other devices, such as game consoles, central server type computers, etc.

This disclosure is organized as follows. Section A provides an overview of the video processing techniques that are used to improve the bandwidth-related efficiency of video processing operations. Second B discusses an exemplary apparatus for implementing the strategy described in Section A. Section C provides additional details regarding the manner of operation of the apparatus described in Section B. And Section D discusses an exemplary computer environment for implementing the apparatus described in Section B.

A. Overview of Design Strategy

Figure 2:
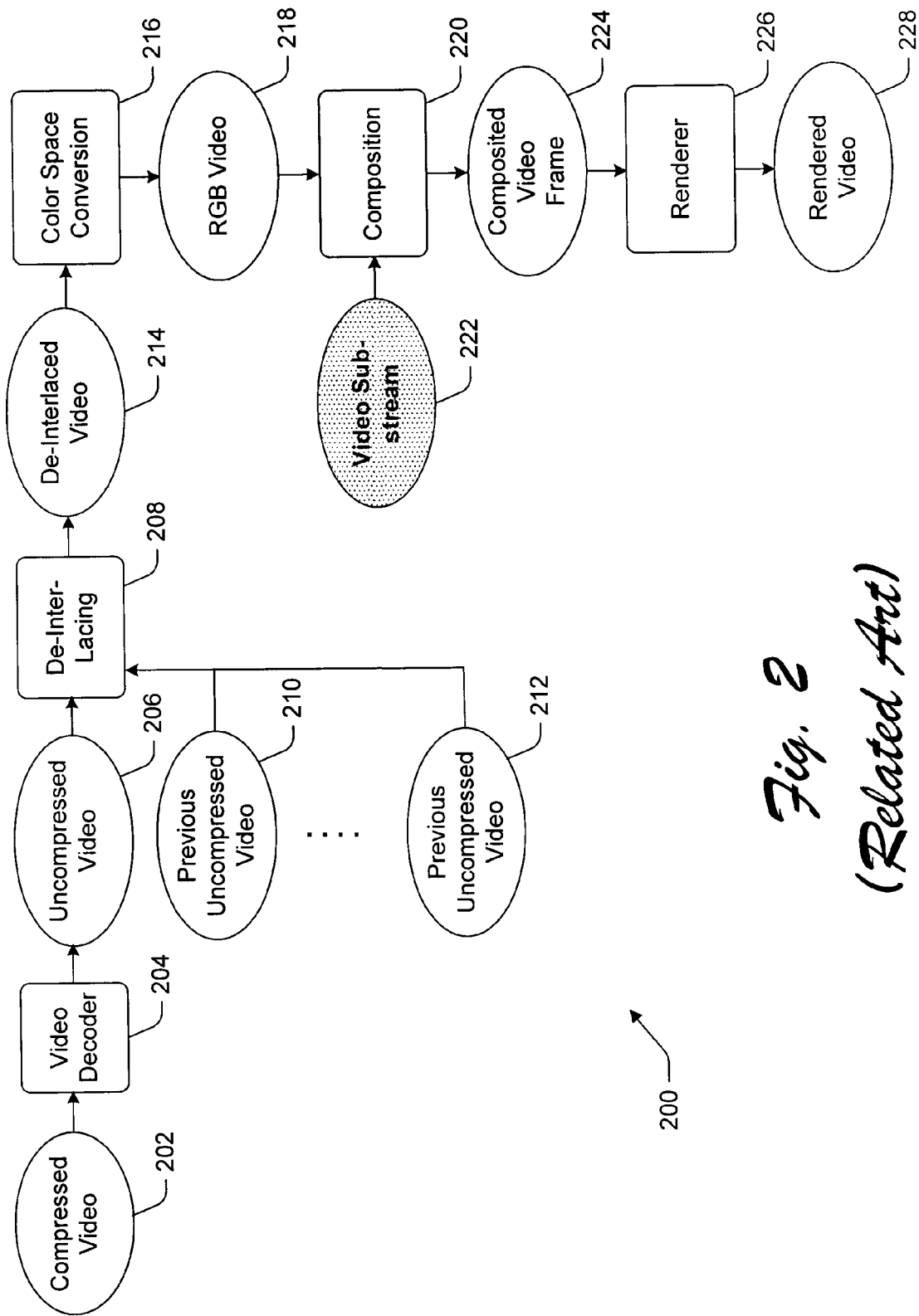
FIG. 2 shows a graphical processing pipeline that performs de-interlacing in series with combining a video stream with a video sub-stream.
Figure 3:
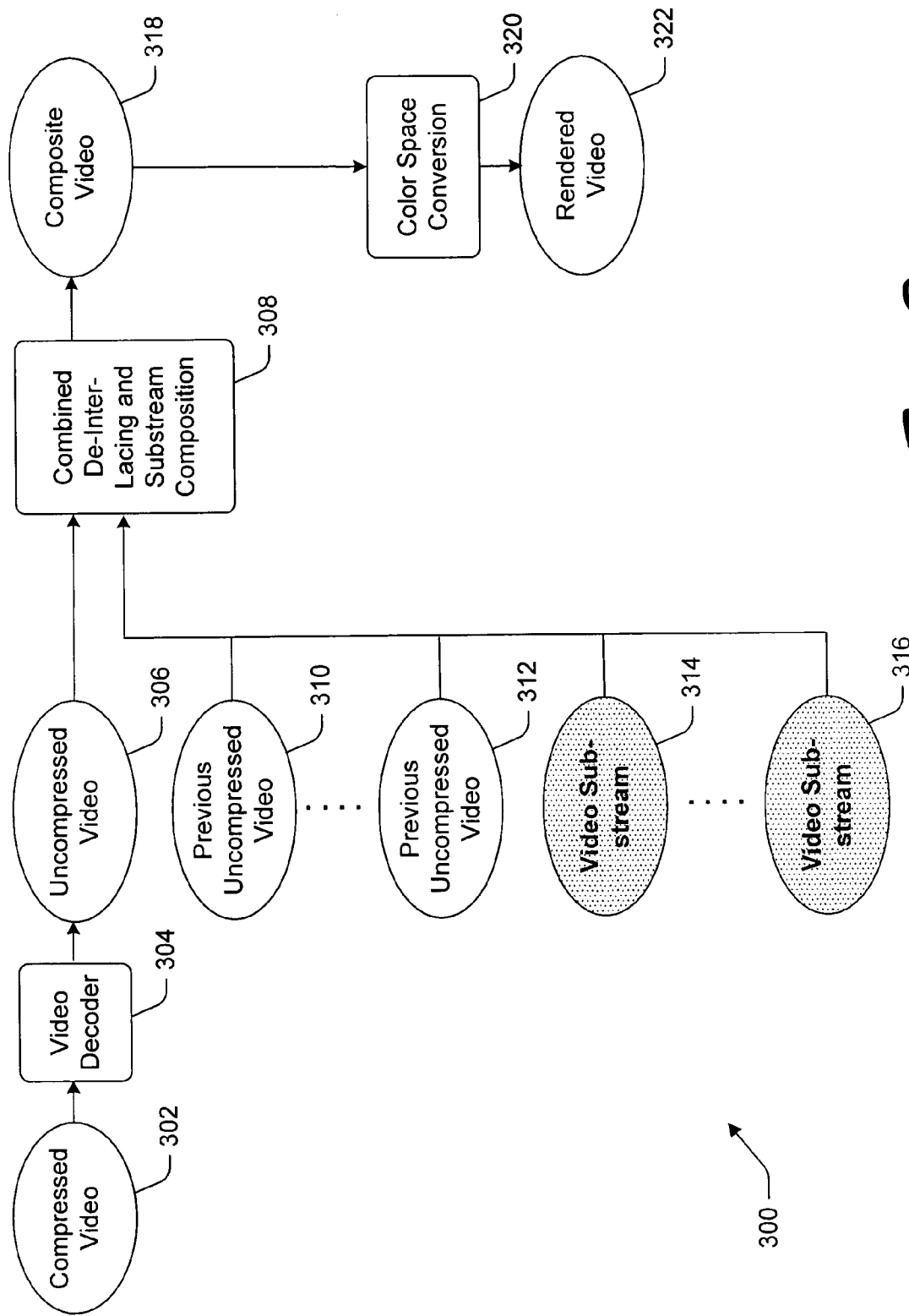
FIG. 3 shows a graphical processing pipeline that performs de-interlacing at the same time that it combines a video stream with a video sub-stream.

FIG. 3 shows an overview of exemplary design principles that can be employed to improve the bandwidth-related performance of a device that renders video stream data. However, an appreciation of the merits of the design shown in FIG. 3 can best be gleaned by an introductory discussion of a related system 200 shown in FIG. 2. The related system 200 shown in FIG. 2 can be implemented using techniques described in commonly assigned copending application 10/273,505, entitled Methods and Apparatuses for Facilitating Processing of Interlaced Video Images for Progressive Video Displays," which names Stephen J. Estrop as sole inventor, and which is incorporated by reference herein in its entirety. Generally, in both FIGS. 2 and 3, the ovals represent data that may be stored in respective memory locations, and the boxes represent actions performed on such data. More specifically, the boxes can represent actions that require at least one read to memory to receive input data, and at least one write to memory to provide output data.

More specifically, the system 200 shown in FIG. 2 can be implemented, at least in part, using a graphics module coupled to a personal computer, game console, or other kind of processing device. The graphics module may constitute processing logic permanently coupled to the computer, game console, or other kind of device. Alternatively, the graphics module can constitute processing logic that is detachably coupled to the computer, game console, or other kind of device. In the latter case, the graphics module can constitute a graphics processing unit (GPU) card that can be detachably coupled to the computer, game console, or other kind of device. As well known in the art, a graphics processing unit can implement a series of operations directed to the graphical rendering of information. Such operations can include various tasks associated with a conventional three dimensional graphics pipeline. In the specific case of FIG. 2, only a subset of operations pertinent to de-interlacing and integrating video sub-stream data are shown. More specifically, the circles shown in FIG. 2 represent data at various stages in the pipeline, while the rectangles represent operations performed on the data.

To begin with, the system 200 begins by receiving compressed video data 202 and decoding the compressed video data 202 in a video decoder 204. Video decoding can constitute converting the compressed video data 202 from its received form (e.g., MPEG-2 format or some other format) to another format suitable for processing, as well as potentially uncompressing the received video data. Video decoding can also constitute performing motion compensation or iDCT operations. As a result of these operations, the video decoder 204 yields uncompressed video data 206. This video data 206 constitutes a current frame of video data that is fed into the de-interlacing logic 208. The de-interlacing logic 208 typically works by processing a current frame with respect to one or more previous frames of received video data. To this end, FIG. 2 also indicates that previous uncompressed video data 210 and previous uncompressed video data 212 are fed into the de-interlacing logic 208. The dotted line that separates video data 210 from video data 212 indicates that additional samples of uncompressed video data can be fed into the de-interlacing logic 208. The de-interlacing logic 208 itself can employ the well-known bob and weave algorithm, or another other kind of de-interlacing algorithm. The output of the de-interlacing logic 208 constitutes de-interlaced video data 214. In other words, the de-interlaced video 214 constitutes a progressive frame of video data.

Video data is commonly represented in conventional video color space, e.g., using conventional Y, U, V color components. The Y component generally represents the brightness of a pixel in the video image frame. The U and V components generally represent the color of the pixel. More specifically, in one exemplary implementation, the Y component is related to the red (R), green (G), and blue (B) components of a pixel in a video frame according to the formula:

Given:

$Kr=0.299$ $Kb=0.114$ $L=Kr*R+Kb*B+(1-Kr-Kb)*G$

Then:

$Y=\text{round}(219*L/255)+16$ $U=\text{round}(224*0.5*(B-L)/((1-Kb)*255))+128$ $V=\text{round}(224*0.5*(R-L)/((1-Kr)*255))+128.$ The U component of the pixel is represented by U=B−Y, and the V component of the pixel is represented by V=R−Y. The color space conversion logic 216 converts the Y, U, and V video components to their counterpart R, G, and B components. This yields RGB video data 218. It is conventional to convert video signals into R, G, and B components because graphics processing functionality is traditionally configured to process image data in this format. The color space conversion logic 216 also can combine the color processing operation with a pixel aspect ratio correction process.

Next, composition logic 220 combines the RGB video data 218 with video sub-stream data 222 to yield composite video frame data 224. The video sub-stream data 222 can constitute closed caption data, any type of supplemental information associated with the presentation of DVD video information, PAL Teletext images, and so on. Although nothing in this disclosure limits the form that the video sub-stream data 222 can take, current manifestations of such data 222 typically take a much simpler form compared to the received primary video data. For instance, this sub-stream data 222 most commonly takes the form of simple graphical overlay data.

Finally, renderer functionality 226 processes the composite video frame data 224 to provide rendered video 228 which is output to a display device (not shown). At this stage in the pipeline, the system 200 can also alter the transparency of each stream and, if required to do so, horizontally or vertically invert the video image. At this stage, the system 200 can also resize the final image and draw it to the implementing device's display. This can be performed by writing data directly to the implementing device's frame buffer or to the device's back buffer which is flipped to the foreground upon a next vertical retrace signal.

The system 200 shown in FIG. 2 works well providing that sufficient processing power is incorporated into the device that implements the system 200. However, as noted in the Background section of this disclosure, developers often opt to reduce the processing power of the implementing device in order to provide a more economical, and thus potentially more marketable, device. For instance, an implementation that devotes separate memory to each of the CPU and GPU used by the implementing device will typically have better performance than an implementation that provides a single memory for shared use by the CPU and GPU (that is, a Unified Memory Architecture design). The operations performed by system 200 may be problematic when performed on such lower-end or medium-end architectures.

More specifically, the design implemented by the system 200 requires at least two significant processing operations performed in series. First, the de-interlacing logic 208 de-interlaces a collection of video samples (e.g., samples 206, 210, 212, etc.). This imposes a first demand on the bandwidth of the implementing device. Then, in a second stage, the composition logic 220 adds the sub-stream video data 222 to the RGB video data 218. This imposes a second demand on the bandwidth of the implementing device. If multiple pieces of video sub-stream data need to be added to the RGB data 218, then the composition logic 220 may further require multiple passes to execute its function. All of this can begin to overload the implementing device. This, in turn, can result in the failure to render the principal video data and video sub-stream data 222 at a normal frame rate. These problems are compounded by the conversion of the YUV data to RGB data. RGB data often takes more bits to represent the color compared to YUV data, thus adding extra overhead to the operations that follow the color space conversion 216.

FIG. 3 shows a system 300 that solves the potential problems shown in FIG. 2. FIG. 3 starts with the same operations as the system 200 shown in FIG. 2. Namely, in FIG. 3, compressed video data 302 is provided to a video decoder 304 to yield a current frame of uncompressed video data 306. Further, also like the case of FIG. 2, the current frame of uncompressed video data 306 is sent to de-interlacing logic 308, along with one or more previous samples of uncompressed video (e.g., previous uncompressed video data 310 and 312). However, unlike the case of FIG. 2, the logic 308 shown in FIG. 3 also functions to add video sub-stream data (e.g., from video sub-stream data 314, 316, etc.) to the video data that is in the process of being de-interlaced. In other words, the logic 308 effectively combines the de-interlacing operation with the sub-stream compositing operation. Further, as will be described in greater detail below, the logic 308 executes these two functions such that they can be performed in a single memory read/write operation, rather than in multiple passes. That is, whereas the system 200 shown in FIG. 2 requires at least two stages to perform the de-interlacing and the compositing operations (requiring at least two reads from memory), the system 300 shown in FIG. 3 requires only a single stage (e.g., a single memory read/write transaction) (that is, requiring, in one exemplary case, only a single read from memory).

As will be discussed in greater detail in later sections of this disclosure, the above-described bandwidth efficiency can be achieved by assigning video data (e.g., video data 306, 310, 312, etc.) and the video sub-stream data (e.g., 314, 316, etc.) to different respective texturing units employed by the GPU module used in the rendering device. In their most common application, texturing units are assigned to image surfaces to be manipulated in the course of a three-dimensional rendering application. For instance, a "texture" generally refers to an image that is "pasted" onto the surface of a geometric primitive (e.g., a triangle) that then forms a part of a three dimensional scene to be rendered. For instance, the texture of a brick wall can be pasted onto a mesh of triangles, and the texture of a shadow can thereafter be pasted on top of that, and so on. Wolfgang F. Engel, *Direct3D: ShaderX: Vertex and Pixel Shader Tips and Tricks*, 2002, Wordware Publishing, Inc. provides background information regarding this technology. These different texture surfaces are assigned to different so-called texturing units. GPUs are designed to process image data provided by the texturing units in a particularly streamlined and parallel manner to facilitate the rapid display of 3D data, for instance, in a gaming environment which demands real time rendering. The system shown in FIG. 3 assigns video data (e.g., 306, 310, 312, etc.) and video sub-stream data (314, 316, etc.) to respective texturing units and thus achieves similar efficient performance of the de-interlacing and compositing operations. More specifically, the GPU logic essentially reads and processes data from each of a collection of texturing units at the same time, instead of in a staggered serial fashion. This reduces the bus congestion in the implementing device, and better enables the implementing device to present the video data and associated video sub-stream data at an optimal frame rate.

In other implementations, the logic 308 can provide other processing functions besides de-interlacing and compositing, such as image resizing. In other implementations, the logic 308 can replace one or more of the above-enumerated operations with other kinds of operations. For instance, if the video data is already in progressive format, the logic 308 can be dedicated to simply resizing the video data, or performing some other desired operation on the video data.

Continuing with the discussion of FIG. 3, the output of logic 308 includes composite de-interlaced video data 318. This video data 318 is still in YUV color space at this time, as opposed to RGB color space. Color space conversion logic 320 converts the YUV data into RGB data and renders this data to the display to yield rendered video data 322. Note that, compared to FIG. 2, the video data is maintained in YUV form farther along into the video pipeline. This offers additional potential bandwidth savings. For instance, in one implementation, YUV data can be presented using 12 bits (8 bits for the Y component, 2 bits for the U component, and 2 bits for the V component). In contrast, in one implementation, RGB data requires 32 bits to represent. Hence, performing such tasks as compositing using YUV data instead of RGB data cuts down on the bus traffic association with this transaction.

Experiments indicate the system 300 shown in FIG. 3 achieves a 62% bandwidth saving compared to the system 200 shown in FIG. 2.

B. Exemplary Apparatus for Implementing the Design Strategy

Overview of Apparatus

Figure 4:
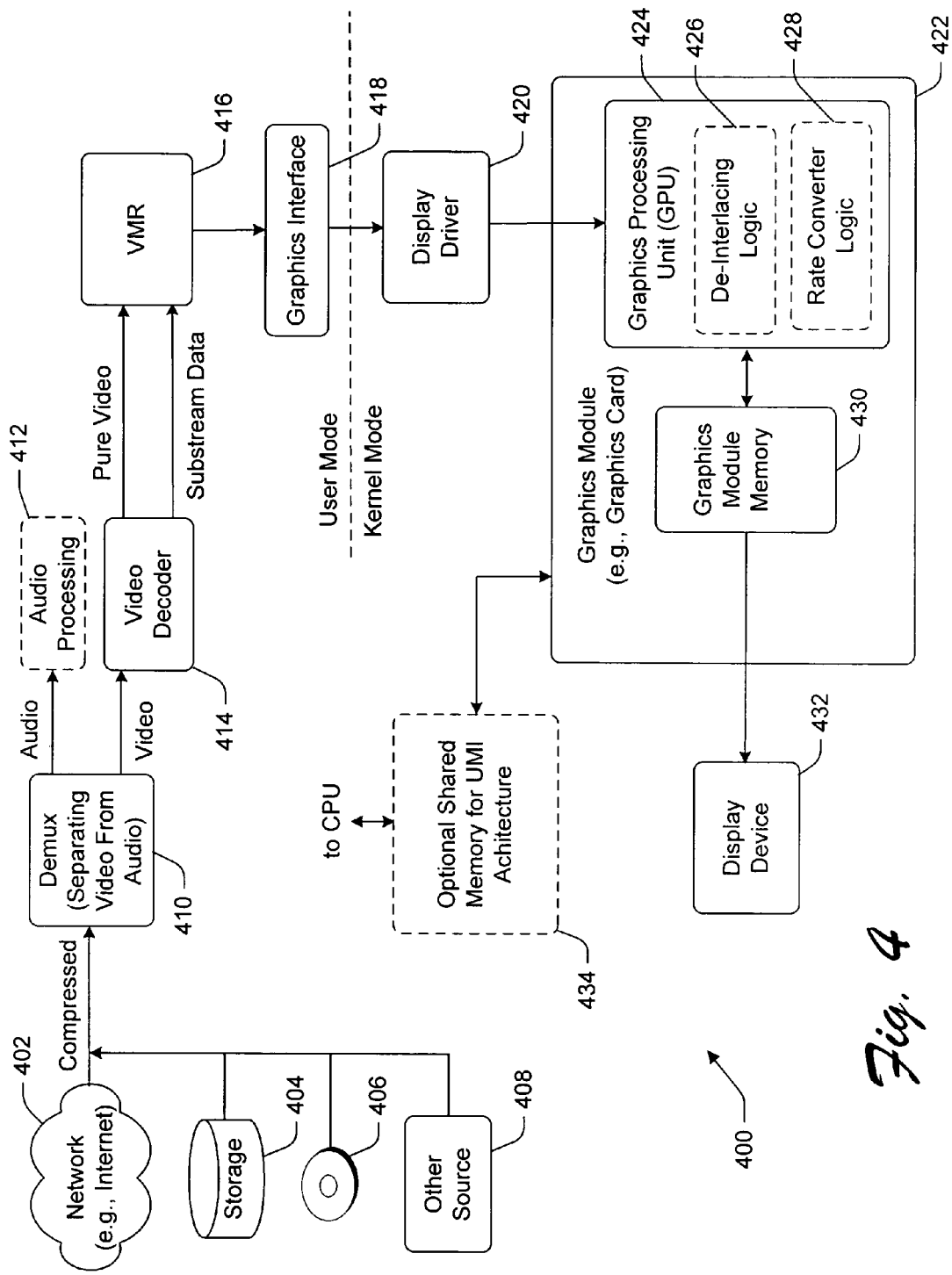
FIG. 4 shows an exemplary apparatus for implementing the graphical processing pipeline shown in FIG. 3.

FIG. 4 shows an overview of an exemplary apparatus 400 that can be used to implement the design solution shown in FIG. 3. The apparatus 400 particularly relies on the DirectX® family of technologies produced by Microsoft® Corporation of Redmond, Washington. The DirectX family includes, DirectX Video Acceleration (DirectX-VA), Direct3D, DirectDraw, etc. However, the principles described above can be performed using other kinds of rendering technologies that run on other kinds of operating systems besides the Windows® operating system. The apparatus 400 can represent a personal computer, a game console (such as Microsoft® Corporation's Xbox™ gaming console), or other kind of device.

To begin with, the apparatus 400 accepts video data from any one of a number of sources. For example, the apparatus 400 can accept video data from a network 402 (such as a remote source coupled to the Internet), any kind of database 404, any kind of computer readable disc media 406 (such as an optical disk, DVD, etc.), or some other source 408. Although not shown, the video data can also be received via wireless broadcast signal or some other broadcast format. The video data is typically stored and transmitted in compressed format (e.g., in one of the MPEG formats, or some other format). However, the received data need not be compressed. The received data will typically contain a combination of video data and audio data. A demux unit 410 separates the audio data from the video data. Audio processing functionality 412 processes the audio information. However, as this disclosure does not directly pertain to the processing of audio data, further details regarding this functionality are omitted so as not to unduly complicate this disclosure.

A video decoder 414 processes the video data. The video decoder can convert the compressed video data from its received format to some other format, as well as perform initial resizing or other operations on this data. The output of the video decoder 414 can include so-called pure video data as well video sub-stream data. The pure video data constitutes the primary video stream to be rendered on the display device. The video sub-stream data can constitute any supplemental information associated with the pure video data, such as close-captioning data, any kind of graphical overlay data (such as various graphical editing controls), various kinds of sub-images presented by DVD players, and so on.

In one exemplary implementation, a video mixing renderer (VMR) module 416 performs a central role in the processing of the thus received video data. By way of overview, the VMR module 416 interacts with a graphics interface 418 and a display driver 420, which, in turn, controls a graphics module 422. As will be described in greater detail in the next section, this interaction involves probing the capabilities of the graphics module 422. This interaction also involves coordinating the processing of the video data by the graphics interface 418, display driver 420, and graphics module 422. In one implementation, the graphics interface 418 can be implemented using the DirectDraw functionality provided by Microsoft® Corporation's DirectX. DirectDraw serves in this context as a messaging conduit for communicatively coupling the VMR module 416 to the graphics module 422. The graphics module 422 itself can constitute a fixed module within a computer or like device, or it can constitute a detachable unit, such as a graphics card. The vertical chain of functionality represented by the VMR module 416, graphics interfaces 418, display driver 420, and graphics module 422 is divided into a user mode and a kernel mode. As well understood in the operating system art, the user mode refers to aspects of the programming functionality that can be manipulated by the user via various interfaces. The kernel mode represents aspects of the programming functionality that cannot be directly manipulated by the user.

The graphics module 422 itself includes one or more graphics processing units (GPUs) 424. A GPU 424 is generally a processing device like the CPU. The GPU 424 is commonly allocated data-intensive rendering tasks that are repetitively performed by the implementing apparatus 400.

Allocating these repetitive or data-intensive tasks to the GPU 424 frees the CPU (not shown) to perform other tasks, and thus improves the performance of the apparatus 400. Two exemplary tasks that this invention allocates to the GPU 424 are de-interlacing and rate conversion. These functions are represented by de-interlacing logic 426 and rate converter logic 428. The de-interlacing logic 426 combines two or more fields of video data together to form a frame of video data. The rate converter logic 428 modifies the frame rate of a sequence of video frames.

The GPU 424 can interact with a local memory 430 associated with the graphics module 422. This local memory 430 can serve any number of storage-related purposes. For instance, this memory 430 can store a final video surface which is then forwarded to a display device 432. The local memory 430 can also store the input surfaces that will be processed by the GPU 422 to yield the final output surface. That is, the local memory 430 can be used to implement the texturing feature describe above. In addition, or alternatively, the apparatus 400 can rely on shared memory 434 provided by a unified memory architecture (UMA). The unified memory 434 can be shared by the CPU (not shown) and the GPU module 422.

Allocation of Texturing Units for Performing Combined Operation

Figure 5:
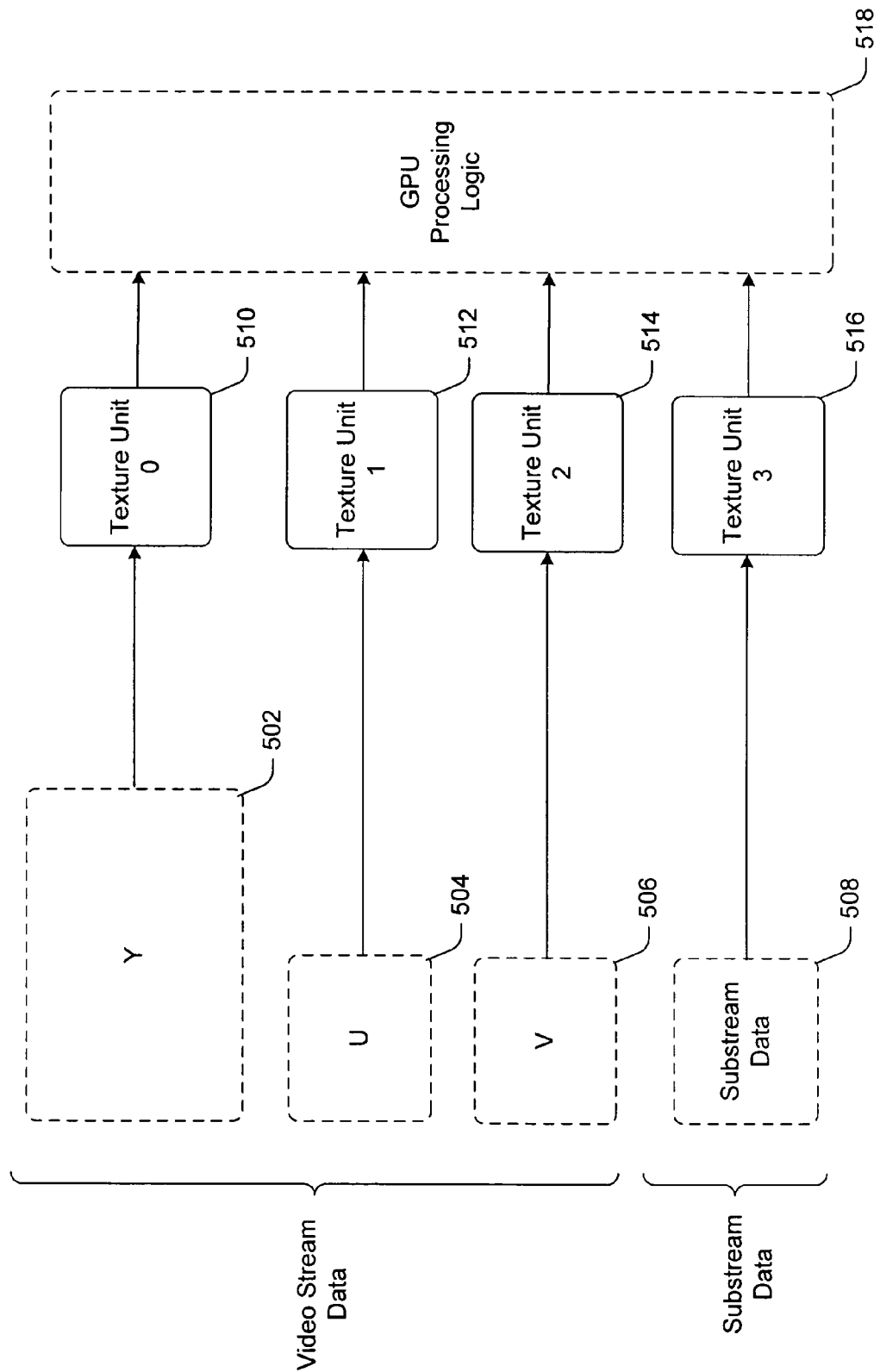
FIG. 5 shows an exemplary allocation of texturing units to components of a video stream and to a sub-stream, respectively.

FIG. 5 shows an exemplary organization 500 of texturing units and associated memory. These elements are used to process the principal video data simultaneously within the video sub-stream data. The memory and texturing units can be implemented using the local memory 430 associated with the graphics module 422 shown in FIG. 4, and/or the shared memory 434.

The joint operation of interleaving and compositing take place while the video data is still in YUV form. Hence, the VMR module 416 allocates portions of memory for storing this YUV data. A first block 502 can be allocated to storing Y data, a second block 504 can be allocated to storing U data, and a third block 506 is allocated to storing V data. More bits are allocated to the Y data than the U and V components. For instance, for an image that contains 720× 480 pixels, a block of 720×480 bytes can be allocated to storing the Y data, a block of 360×240 bytes can be allocated to storing the U data, and a block of 360×240 bytes can be allocated to storing the V data. Finally, a block 508 of memory can be allocated to storing sub-stream data (such as close-captioning data, DVD sub-image display data, graphical icons of various sorts, and so on).

In the exemplary organization 500 shown in FIG. 5, only four texturing units are shown (510, 512, 514, and 516). However, other implementations will include more than four units. Texturing unit 510 is allocated to handling an image input surface associated with memory block 502 (i.e., the Y data), texturing unit 512 is allocated to handling an image input surface associated with memory block 504 (i.e., the U data), and texturing unit 514 is allocated to handling an image input surface associated with memory block 506 (i.e., the V data). Texturing unit 516 is allocated to handling an image input surface associated with memory block 508 (i.e., the sub-stream data). The memory blocks (Y, U, V, and the sub-stream data) are separate, but need not be contiguous in memory. Additional memory blocks and texturing units can be provided to handle additional video reference samples and/or additional video sub-streams. For instance, an application that includes two previous reference streams would require at least nine texturing units (e.g., three units for the current sample, and six units for the two reference samples).

Finally, FIG. 5 generically shows GPU processing logic 518 associated with the GPU 424 of FIG. 4. The GPU processing logic 518 interacts with the texturing units. The GPU processing logic 518 can perform de-interlacing, frame rate conversion, and/or other task(s).

C. Exemplary Method of Operation

Overview

Figure 6:
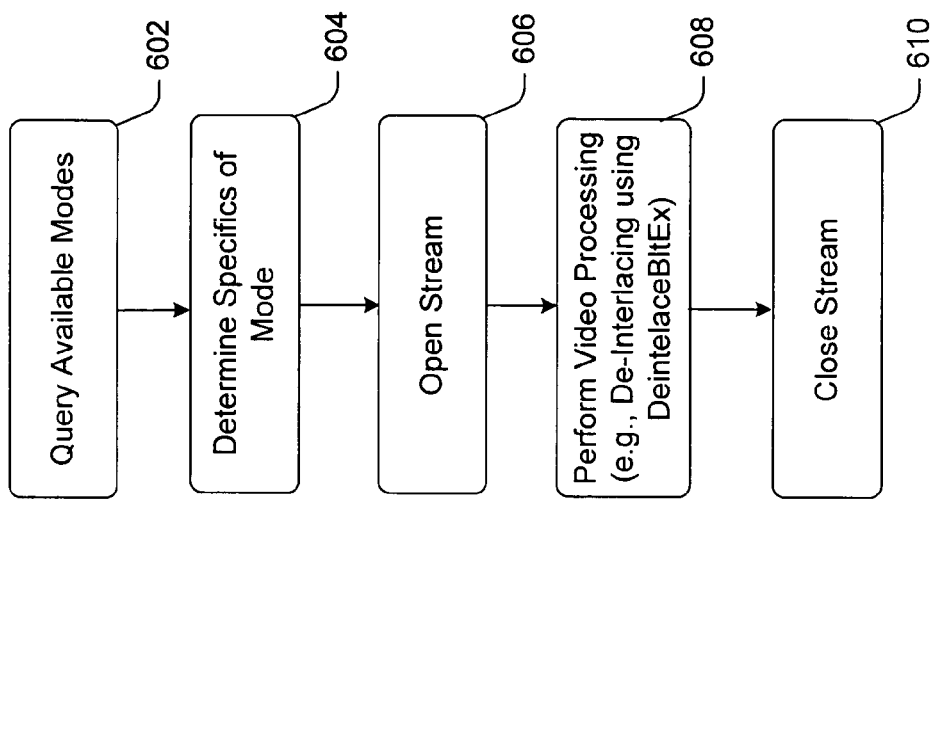
FIG. 6 illustrates an overview of a procedure for performing multiple video processing tasks substantially in parallel.

FIG. 6 shows an overview 600 of the operation of the apparatus 400 shown in FIG. 4. Certain aspects of this overview 600 are common to the processing described in the above-referenced copending U.S. Ser. No. 10/273,505. Hence, particular attention will be paid in the ensuing discussion to features that are unique to the joint de-interlacing/compositing functionality of the present invention.

To begin with, in step 602, the VMR module 416 queries the display driver 420 and graphics module 422 regarding what processing modes it supports. After it receives a reply, in step 604, the VMR module 416 sends another inquiry to find out more specific information regarding the capabilities of the display driver 420 and associated graphics module 422. Steps 602 and 604 are discussed in greater detail below under the general heading of "preliminary data processing."

After investigating the capabilities of the attached hardware and associated interfaces, the VMR module 416 opens a video stream object so that video data and control information can be forwarded to the hardware. Then, in step 608, the VMR module 416 coordinates the execution of one or more video processing functions by the hardware (e.g., by the graphics module 422). One such function is de-interlacing. Another such function is sub-stream compositing. De-interlacing can be combined with compositing as described above, or either function can be performed separately depending on the received data. For instance, if progressive video data has been received, there is no need to perform de-interlacing; in this case, the VMR module 416 may simply resize the object, add video sub-stream data to it, or perform some other function or combination of functions. Many other functions are be implemented besides de-interlacing and compositing.

Finally, in step 610, the VMR module closes the video stream that it opened in step 606. This step 610 may be in response to a command given by the user, or simply in response to running out of streaming video data, etc.

The following discussion presents more fine-grained information regarding selected steps referenced above.

Initialization Steps

In step 602 described above, the VMR module 416 asks the display driver 420 what processing functionality that it supports with respect to an input video format. When the display driver 420 responds, the VMR module 416 sends a request for more specific information regarding the requirements of the display driver 420 for a particular mode. The display driver 420 responds by specifying various information within a data structure. Such information identifies a number of forward reference samples required, a number of backward reference samples requested, a format of the output frame, etc. A flag is also included in this data structure that indicates whether support for combined de-interlacing and compositing is supported by the graphics module 422 and associated interfaces. This flag is referred to as the DXVA_VideoProcess_Sub-streams flag in an exemplary implementation.

Further, in order to correctly support the combined de-interlacing and compositing, the graphics module 422 and associated interfaces and drivers should be capable of independently stretching (horizontally and/or vertically) both the video frame that is being de-interlaced as well as the supplied video sub-streams. This is required in one implementation because the pixel aspect ratio of the primary video and the video sub-streams may be different and non-square in nature. The display driver 420 can communicate its ability to handle this functionality by returning DXVA_VideoProcess_StretchX and DXVA_VideoProcess_StretchY flags that convey its ability to stretch the images, in addition to the DXVA_VideoProcess_Sub-streams flag.

Further still, the DeinterlaceBltEx DDI supports significantly enhanced color information for each source and destination surface. The display driver 420 can indicate the level of support it has for this new color information via various color-related flags, e.g.:
DXVA_VideoProcess_Sub-streaMsExtended;
DXVA_VideoProcess_YUV2RGBExtended; and
DXVA_VideoProcess_AlphaBlendExtended flags.

De-Interlacing Step

The VMR module 416 uses a method referred to as "DeinterlaceBltEx" to coordinate the execution of de-interlacing and compositing by the graphics module 422. More specifically, this DeinterlaceBltEx can be implemented as a single call to the display driver 420, even though it technically involves more than one fundamental operation (de-interlacing and compositing). The DeinterlaceBltEx writes the output of its operation to a specified destination surface.

More specifically, the VMR module 416 forwards the following data structure to the display driver 420 to implement the DeinterlaceBltEx method.

```
HRESULT
DeinterlaceBltEx(
    [in] HDXVA_DeinterlaceStream hDiStrm
    [in] REFERENCE_TIME rtTargetFrame,
    [in] RECT* prcTargetRect,
    [in] DXVA_AYUVsample2 BackgroundColor,
    [in] DWORD DestinationFormat,
    [in] DWORD DestinationFlags,
    [in] LPDDSURFACE lpDDSDstSurface,
    [in] LPDXVA_VideoSample2 lpDDSrcSurfaces,
    [in] DWORD dwNumSurfaces,
    [in] FLOAT Alpha /*0.0F transparent, 1.0F opaque */
);
```

In this structure, the rtTargetFrame parameter identifies the temporal location of the output frame within the sequence of input frames. If only de-interlacing is being performed, the target time should coincide with one of the rtStart times or midpoint times, (rtStart+rtEnd)/2, of a reference sample. If a frame rate conversion is being requested, the rtTargetFrame time may be different from any of the rtstart or midpoint times of the reference samples.

The prcTargetRect parameter identifies the location within the destination surface that the DeinterlaceBltEx operation should write to. In one implementation, the output should be restricted to the pixels within this rectangle; that is, every pixel within the prcTargetRect should be written to, and pixels outside the prcTargetRect should not be modified in any way.

The BackgroundColor parameter identifies a color of the background upon which all the video stream and sub-streams are composed.

The DestinationFormat parameter contains extended color information relating to the destination surface.

The DestinationFlags parameter contains a collection of flags that indicate changes in the destination-related parameters from the previous call to DeinterlaceBltEx. These flags reflect changes to the background color, extended color data, target rectangle or the planar alpha parameter and are provided to aid optimizing the driver code.

The destination surface will be an off-screen plain surface located in video memory (e.g., local memory 430). The pixel format of the destination surface will be the one indicated in the d3dOutputFormat field of the data structure returned to the VMR module 416 in the initialization steps. In one exemplary implementation, the destination surface specified in the structure should be in the YUV color space.

The lpDDSrcSurfaces parameter points to an array of DXVA_VideoSample2 structures. The SampleFormat field in this structure indicates whether the sample is a reference for a de-interlace operation or a video sub-stream sample that needs to be combined with the de-interlaced video frame. Video sub-stream samples should have the DXVA_SampleSub-stream value for their sample format.

More specifically, the VideoSample2 structure is identified below.

```
typedef struct _DXVA_VideoSample2 {
    REFERENCE_TIME    rtStart;
    REFERENCE_TIME    rtEnd;
    DWORD             SampleFormat;
    DWORD             SampleFlags
    VOID*             lpDDSSrcSurface;
    RECT              rcSrc;
    RECT              rcDst;
    DXVA_AYUVsample2  Pal[16];
} DXVA_VideoSample2, *LPDXVA_VideoSample2.
```

In addition to indicating whether the sample is interlaced or progressive, the SampleFormat in the above-identified parameter includes extended color information for each sample This data includes information relating to the: a) color primaries; b) transfer function; c) intended view conditions; d) transfer matrices; and e) black point.

For reference video samples, the rtStart and rtEnd fields indicate the temporal location of the sample. For video sub-stream samples, these fields are cleared to zero.

The source and destination rectangles are used for sub-rectangle de-interlacing or stretching. Note that stretching of video sub-streams is independent of the video stream and that support for stretching is mandatory in one implementation. For the palletized video sub-stream pixel formats, a Pal field of the DXVA_VideoSample2 structure contains 16 palette entries that can be used when compositing the sub-stream sample. For non-palletized pixel formats the palette will be cleared to zero and can be ignored.

Each input sample contains a collection of flags that indicate changes in the current sample from the previous sample. These flags reflect changes to the palette, color data, source, and destination rectangles of each sample and are provided to aid optimizing the driver code.

Continuing with the description of the DeinterlaceBltEx structure, the dwNumSurfaces parameter indicates the number of elements in the lpDDSrcSurface array. The video reference samples will be first in the array followed by the video sub-streams in Z-order. In one exemplary implementation, the number of video sub-streams passed to the driver can range from 0 to 15. Most often when DeinterlaceBltEx is called, the driver will be passed 0 or 1 video sub-streams.

Finally, the Alpha parameter indicates a planar transparency value that can be applied to the composite background color, video stream, and sub-stream image as it is written to the destination surface.

It should be noted that the DeinterlaceBltEx method can be called by the VMR module 416 when progressive video and multiple video sub-streams are received. This can occur, for instance, when the VMR module 416 is used for DVD playback that contains a mixture of progressive and interlaced video. In this case, the display driver 420 will not attempt to de-interlace the video stream (because it is already in the progressive format); rather, the VMR module 416 can be configured to combine the video stream with any given sub-streams, resizing each stream as desired or required. (If a de-interlace mode that needs multiple reference samples is being used with progressive video, the multiple reference samples will still be sent to the display driver 420; however, each reference sample will refer to the same progressive video frame.)

Examples of the Operation of DeinterlaceBltEx

The following examples illustrate how the DeinterlaceBltEx method can combine a principal video stream and a video sub-stream (received from, for example, a closed captioning source). Generally, in these examples, the target rectangle (specified in the DeinterlaceBltEx method) identifies the location within the destination surface that the driver 420 should direct its output to. The source and destination rectangles pertain to video stream information specified in the array of VideoSample2 structures (discussed above).

The DeinterlaceBltEx method specifies the source rectangle coordinates as absolute locations within the source surface. Likewise, the DeinterlaceBltEx method specifies the destination rectangle coordinates and target rectangle coordinates as absolute locations within the destination surface. In practice, the video stream destination rectangle is often the same size as the destination surface, but this is not always the case.

Figure 7:
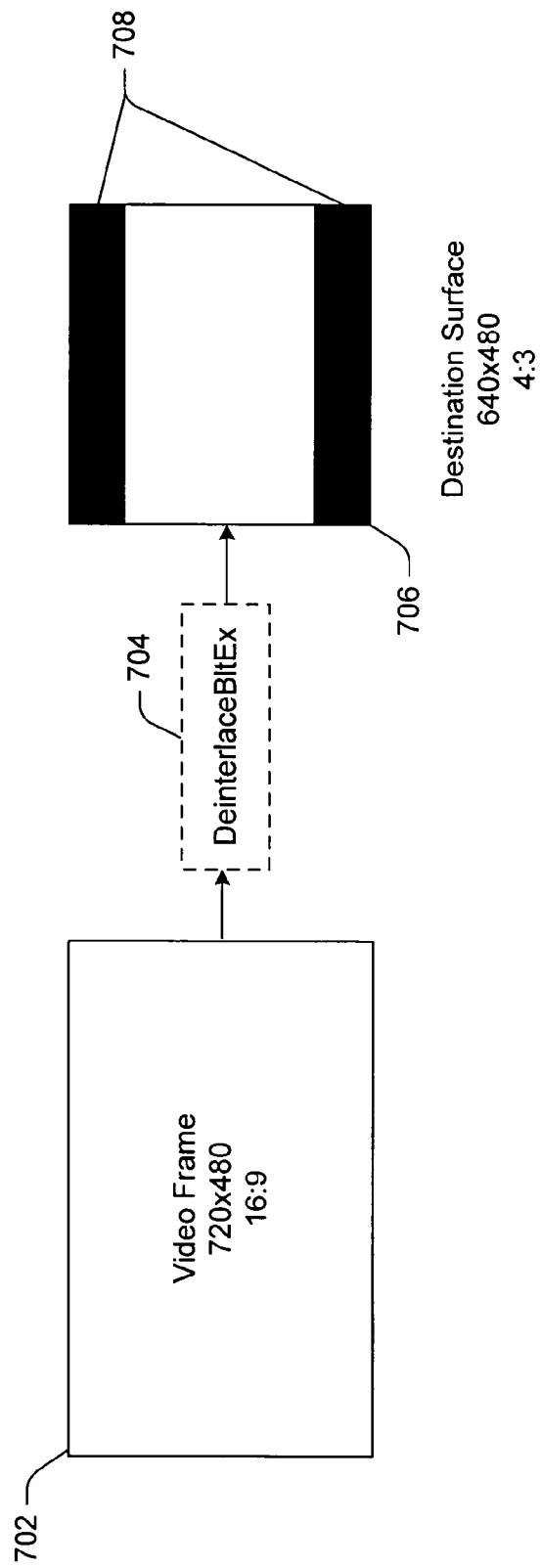
FIGS. 7–13 show examples of the operation of a DeinterlaceBltEx method used in the procedure of FIG. 6.

To begin with, FIG. 7 shows an exemplary case 700 in which the DeinterlaceBltEx method simply manipulates an input video frame (without combining it with a video sub-stream). In this example, the input video stream frame 702 has a size of 720×480 pixels and an aspect ratio of 16:9 (where an aspect ratio specifies a ratio of horizontal to vertical dimensions of the video frame). The destination surface has a size of 640×480 pixels and an aspect ratio of 4:3. The target rectangle has coordinates of {0, 0, 640, 480}, the source rectangle has coordinates of {0, 0, 720, 480}, and the destination rectangle has coordinates of {0, 60,640,300}.

Given these inputs, the DeinterlaceBltEx operation 704 produces the output result 706. The output result 706 shows that the video is letter-boxed into the 4:3 destination surface. In performing the DeinterlaceBltEx operation, the driver 704 should de-interlace the video (if necessary), shrink it within the destination surface, and draw the two horizontal bars 708 in the specified background color. This is therefore an example of a case in which the destination rectangle is not the same size as the destination surface.

Figure 8:
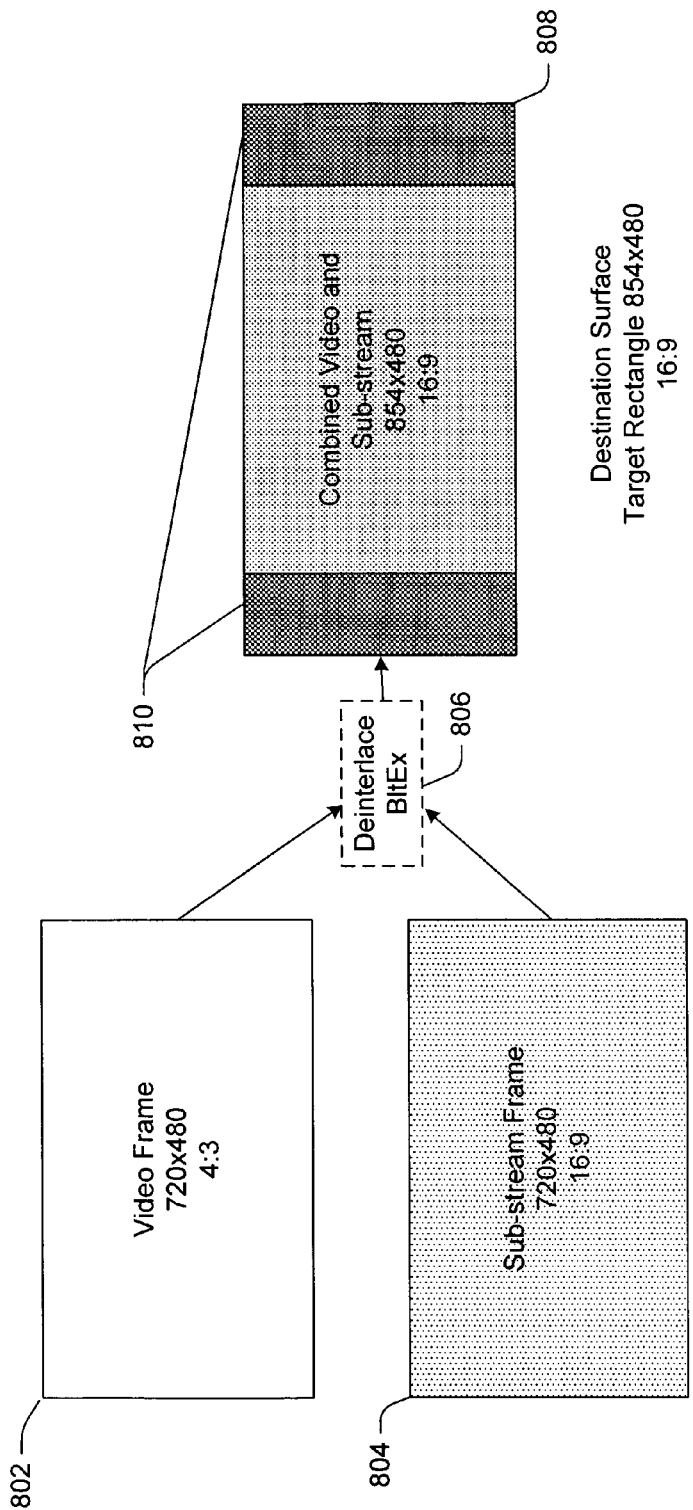

FIG. 8 shows another exemplary case 800 in which the VMR module 416 calls the driver 420 with a video stream destination rectangle that does not fully cover the destination surface. An example of this would be DVD content in which the video stream is specified in the 4:3 aspect ratio and the sub-picture stream is specified in the 16:9 aspect ratio. More specifically, as shown in FIG. 8, the input video frame 802 has a size of 720×480 pixels and an aspect ratio of 4:3. The video sub-stream frame 804 has a size of 720×480 pixels and an aspect ratio of 16:9. The destination surface has a size of 854×480 pixels and an aspect ratio of 16:9. The target rectangle has coordinates of {0, 0, 854, 480}. The source rectangle for the video stream has coordinates of {0, 0, 720, 480} and the corresponding destination rectangle has coordinates of {107, 0, 747, 480}. The source rectangle for the sub-picture stream has coordinates of {0, 0, 720, 480} and the corresponding destination rectangle has coordinates of {0, 0, 854, 480}.

Given these inputs, the DeinterlaceBltEx operation 806 produces the output result 808. As can be seen, the left and right edges 810 of the destination surface do not contain any pixels from the video stream. When performing the DeinterlaceBltEx operation, pixels that fall outside the video stream's destination sub-rectangle should be interpreted as the background color, as they are combined with the pixels from the sub-picture stream.

Figure 9:
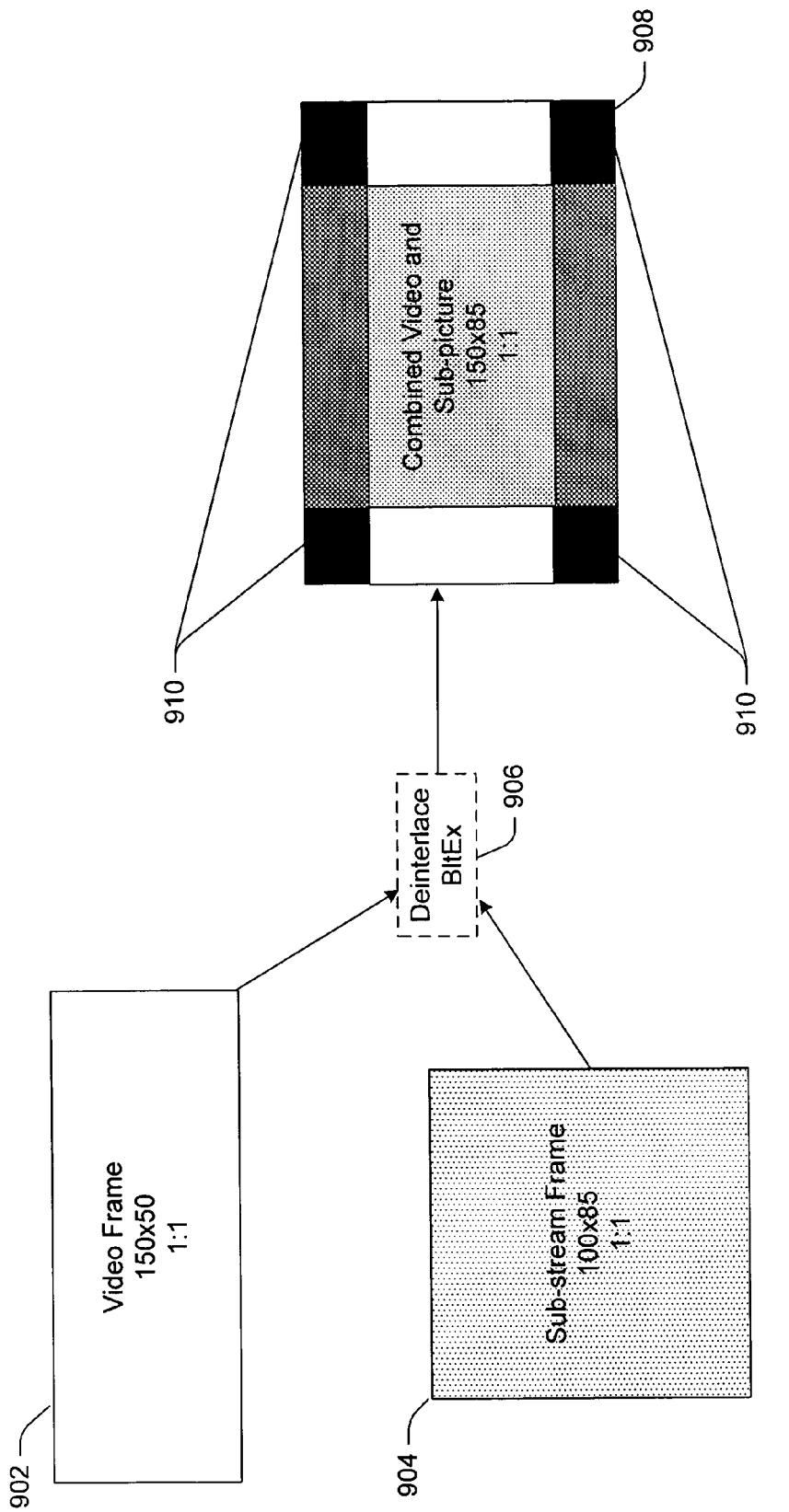

FIG. 9 shows a case 900 in which the video stream and the video sub-stream have different heights as well as widths. In this case, the input video stream frame 902 has a size of 150×150 pixels and an aspect ratio of 1:1. The video sub-stream frame 904 has a size of 100×85 pixels and an aspect ratio of 1:1. The destination surface has a size of 150×85 pixels and an aspect ratio of 1:1. Given these inputs, the DeinterlaceBltEx operation 906 produces the output result 908. As can be seen, the background color is only visible in the four corners 910. The specified background color should only be drawn over the target rectangle.

Figure 10:
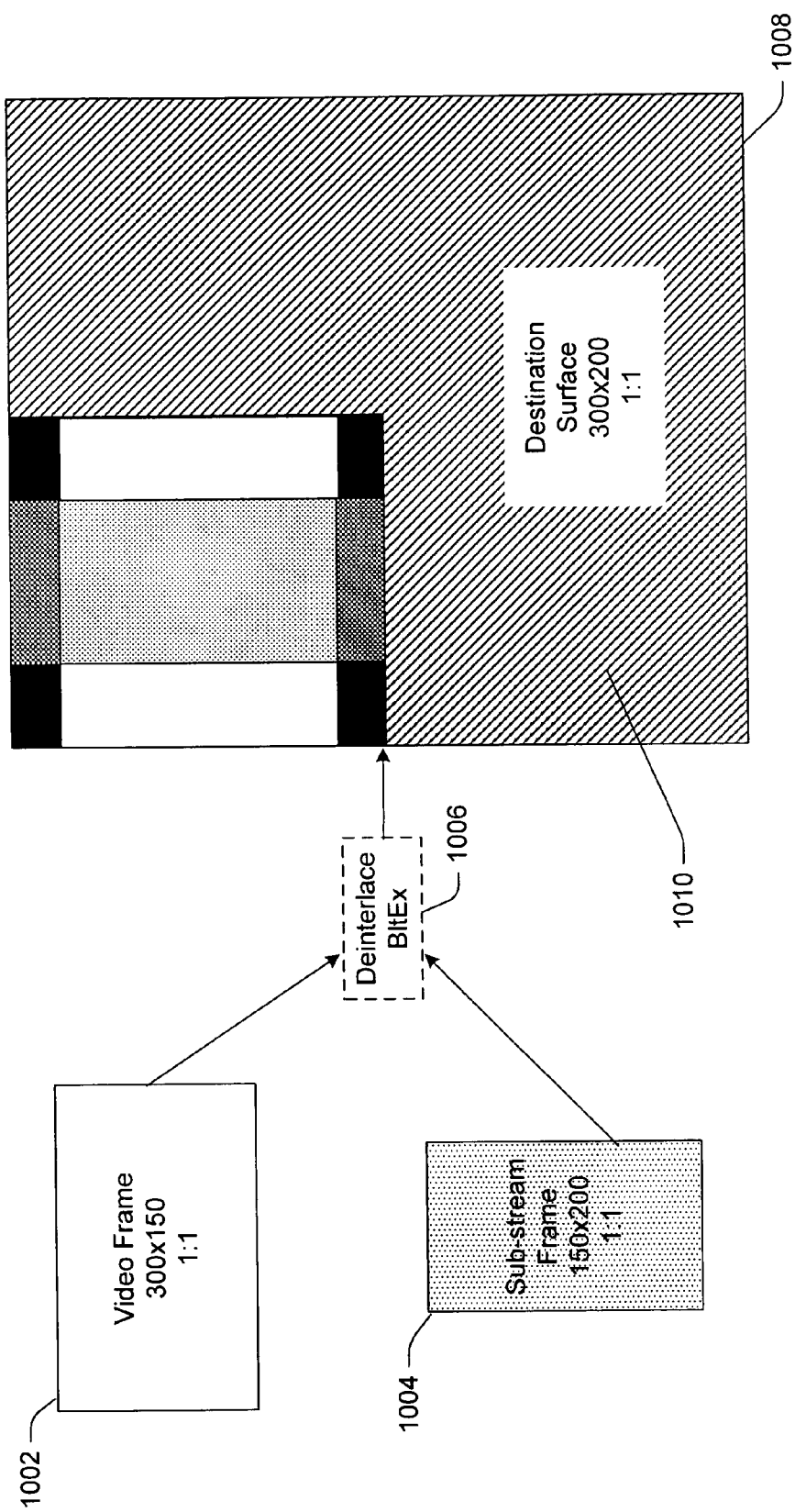

FIG. 10 shows another case 1000 in which the video stream and the video sub-stream have different heights. In this case, the input video frame 1002 has a size of 300×150 pixels and an aspect ratio of 1:1. The video sub-stream frame 1004 has a size of 150×200 pixels and an aspect ratio of 1:1. The destination surface has a size of 300×200 pixels and an aspect ratio of 1:1. The target rectangle has coordinates of {0, 0, 150, 100}. The source rectangle for the video stream has coordinates of {0, 0, 300, 150} and the counterpart destination rectangle has coordinates of {0, 12, 150, 87}. The sub-stream source rectangle has coordinates of {0, 0, 150, 200} and the counterpart destination rectangle has coordinates of {37, 0, 112, 100}.

Given these inputs, the DeinterlaceBltEx operation 1006 produces the output result 1008. Here, the VMR module 416 has been instructed to decimate its normal output image size horizontally and vertically by a factor of two. As a result, the background color should only be displayed in the target rectangle, and the remaining pixels 1010 in the destination surface should not be written to. This is because the target rectangle is the bounding rectangle of the video stream and all the sub-streams.

Figure 11:
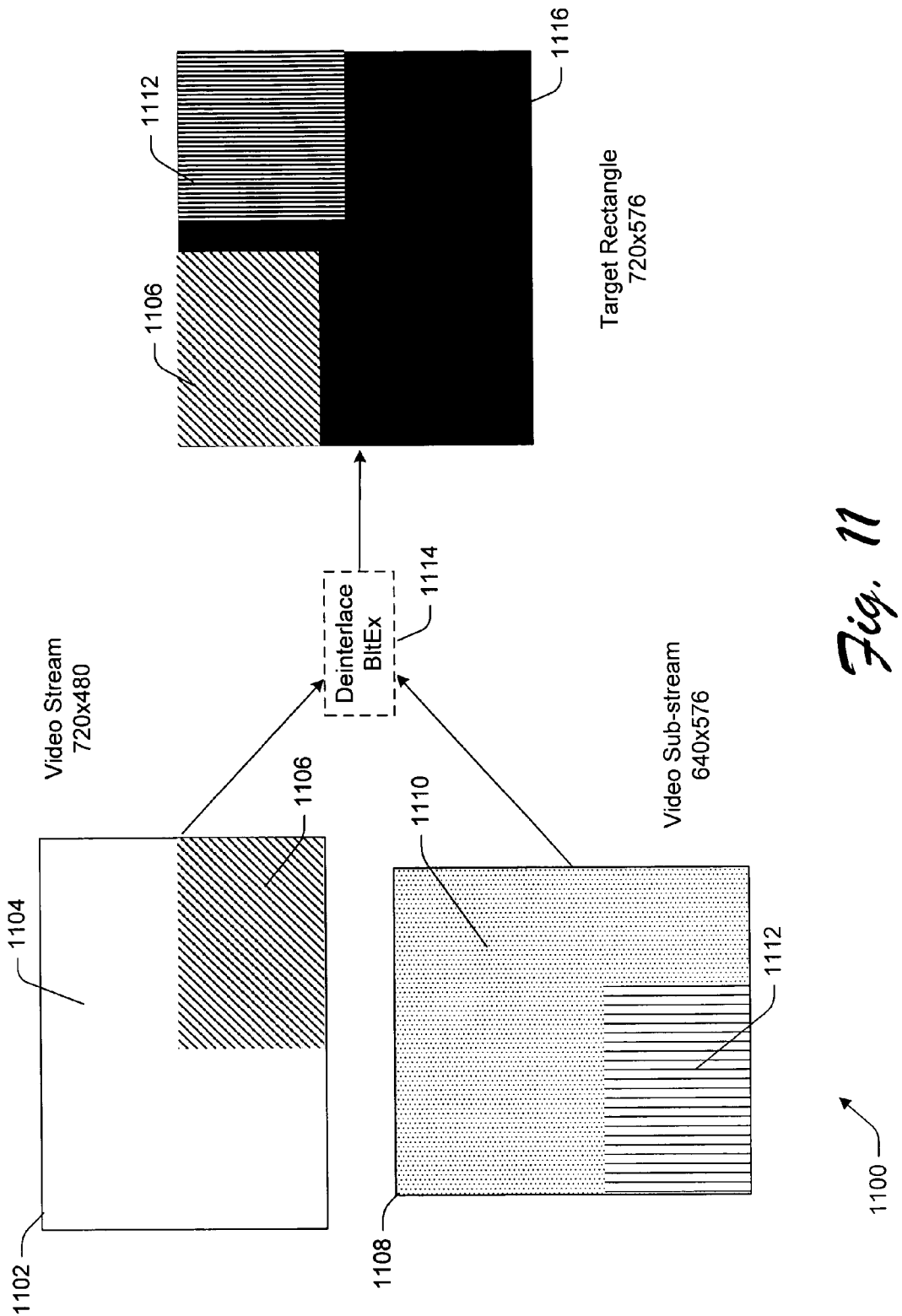
Figure 12:
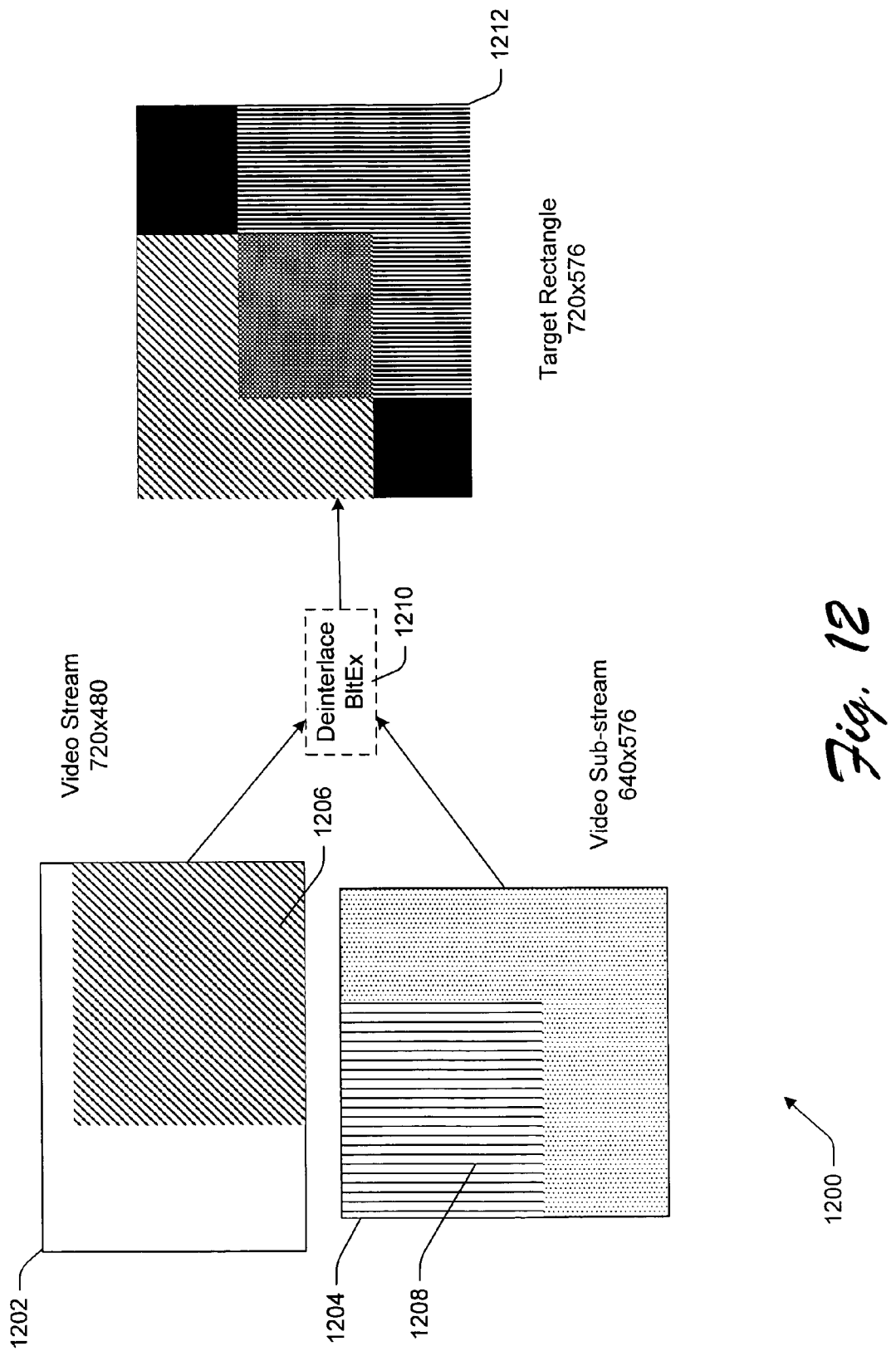
Figure 13:
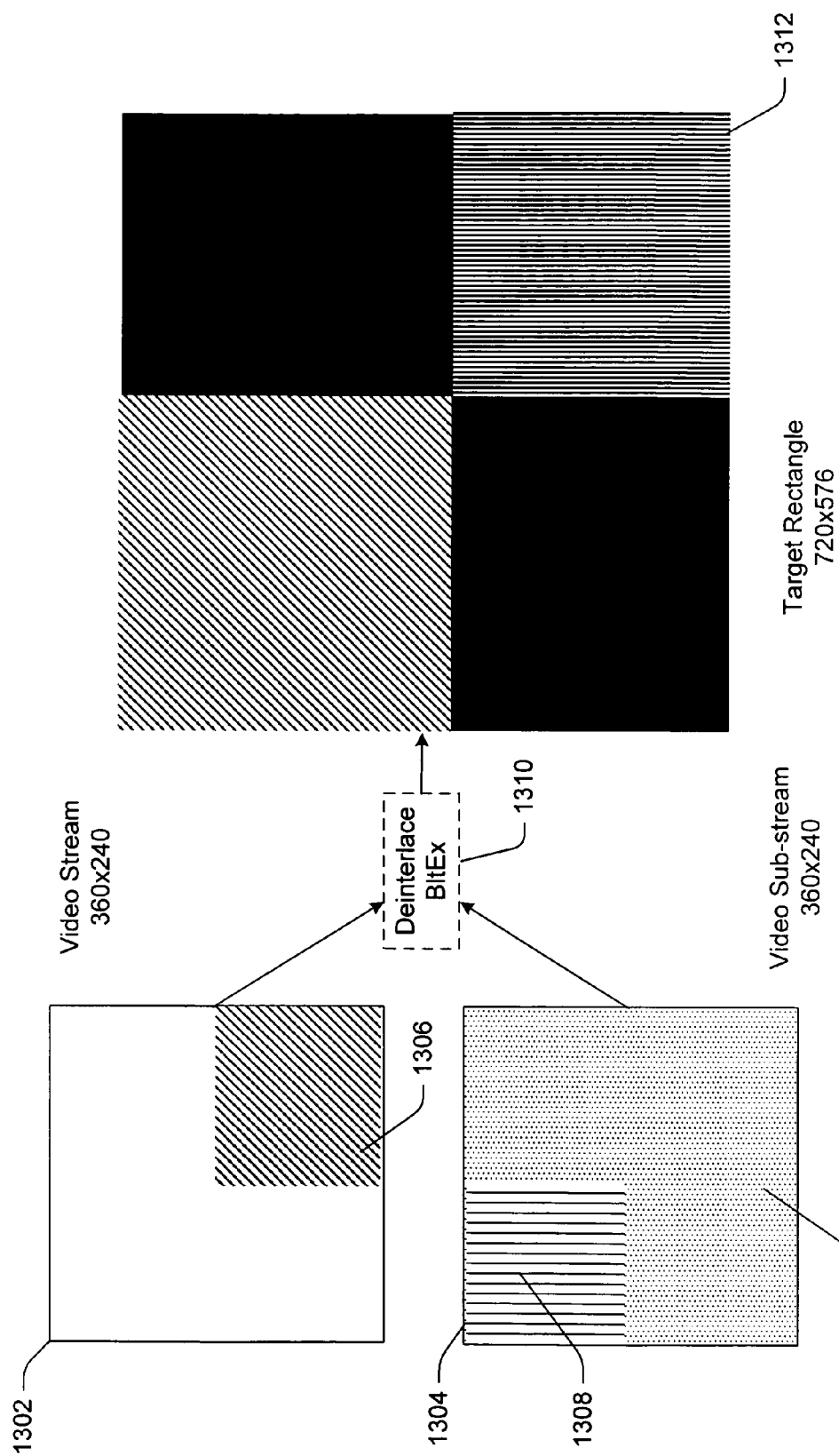

FIGS. 11–13 show cases in which the rcSrc rectangles (specified in the DXVA_VideoSample2 structure) are different from the source sample sizes. This condition can be indicated by setting a DXVA_VideoProcess_SubRects flag. To begin with, FIG. 11 shows an exemplary case 1100 in which no stretching of video images is performed. In this exemplary case, the destination surface has a size of 720×576 pixels, the rcTarget rectangle has coordinates of {0, 0, 720, 576}, and the background color is solid black. The video stream 1102 is characterized by the following rectangles: the source surface 1104 is demarcated by coordinates of {0, 0, 720, 480}; the rcSrc rectangle 1106 is demarcated by coordinates of {360, 240, 720, 480}, and the rcDst rectangle is demarcated by coordinates of {0, 0, 360, 240}. The video sub-stream 1108 is characterized by the following rectangles: the source surface 1110 is demarcated by coordinates of {0, 0, 640, 576}, the rcSrc rectangle 1112 is demarcated by coordinates of {0, 288, 320, 576}, and the rcDst rectangle is demarcated by coordinates of {400, 0, 720, 288}.

Given these inputs, the DeinterlaceBltEx operation 1114 produces the output result 1116. In this result 1116, the bottom right corner of the video stream (i.e., portion 1106) is displayed in the top left corner of the destination surface, and the bottom left corner of the sub-stream (i.e., portion 1112) is displayed in the top right corner of the destination surface. In this example, the hashed areas indicate the sub-rectangles that will be processed.

FIG. 12 shows an exemplary case in which the video stream 1202 and the sub-stream 1204 destination rectangles intersect. In this example, the surface dimensions are the same as the example presented above with respect to FIG. 11. The video stream 1202 is characterized by a rcSrc rectangle 1206 demarcated by the coordinates of {260, 92, 720, 480}, and a rcDst rectangle demarcated by coordinates of {0, 0, 460, 388}. The video sub-stream 1204 is characterized by a rcSrc rectangle 1208 demarcated by coordinates of {0, 0, 460, 388} and a rcDst rectangle demarcated by coordinates of {260, 188, 720, 576}. The target rectangle is again demarcated by the coordinates of {0, 0, 720, 576}, and the background color is solid black.

Given these inputs, the DeinterlaceBltEx operation 1210 produces the output result 1212. In this case, the bottom right corner of the source (i.e., portion 1206) is displayed in the top left corner of the destination, shifted on the X and Y axis by +100. Also, the top left corner of the sub-stream source (i.e., portion 1208) is displayed in the bottom right corner of the destination, shifted on the X and Y axis by −100.

FIG. 13 shows a case 1300 where stretching is performed when combining a principal video stream 1302 and a video sub-stream 1304. Namely, in FIG. 13, the destination surface has a size of 720×480 pixels, the target rectangle has a size demarcated by coordinates of {0, 0,720, 480}, and the background color is black. Further, the video stream source surface 1302 has a size of 360×240 pixels. The video stream 1302 also has source rectangle rcSrc (1306) demarcated by the coordinates of {180, 120, 360, 240} and a destination rectangle rcDst demarcated by the coordinates of {0, 0, 360, 240}. The video sub-stream surface 1308 has a size of 360×240 pixels. The video sub-stream surface 1308 also has a source rectangle rcSrc 1308) demarcated by the coordinates of {0, 0, 180, 120} and a destination rectangle rcDst demarcated by the coordinates of {360, 240, 720, 480}.

Given these inputs, the DeinterlaceBltEx operation 1310 produces the output result 1312. The hashed areas shown in this drawing again indicate the sub-rectangles that are passed to the DeinterlaceBltEx method.

Color Extensions for DeinterlaceBltEx

To improve color fidelity, the apparatus 400 shown in FIG. 4 can also employ a more accurate Y'Cb'Cr' representation when performing color space conversions or video image processing. By way of background, many video formats and standards use different: a) color primaries (e.g., the RGB response functions); b) transfer functions (e.g., the "gamma" function, which governs how to convert R'G'B' to RGB); c) intended viewing conditions (e.g., light or dark rooms); d) transfer matrices (e.g., how to convert Y'Cb'Cr' to R'G'B'; and e) black point (which refers to the conversion to sR'G'B' or to studio R'G'B', including headroom/toeroom).

All of the above-described parameters can be encoded into a single 16 bit WORD. In one exemplary implementation, the DeinterlaceBltEx API has a 32 bit DWORD used to describe the format of a sample, such as whether it is interlaced or progressive, and so on. This uses only the lower 8 bits.

In the present apparatus 400, the upper 16 bits can be used for conveying extra information used to describe the exact Y'Cb'Cr' colorspace. More specifically, in one exemplary implementation, the 16 bits of information can be packed as follows: a) VideoTransferFunction (4 bits, bits 15–12); b) VideoPrimaries (4 bits, bits 11–8); c) VideoLighting (3 bits, bits 7–5); d) Union, including TransferMatrix (3 bits, 4–2) with respect to the Y'Cb'Cr' image, and NominalRange (3 bits, 4–2) with respect to the RGB image; and e) VideoChromaSubsampling (2 bits, bits 1–0).

Each of the above-identified parameters is described below. To begin with, the DXVA_VideoTransferFunction enum indicates the conversion function from R'G'B' to RGB. Roughly, it corresponds to the gamma function of the data. Some transfer functions have corrections to account for 8 bit integer quantization effects.

The DXVA_VideoPrimaries enum lists the color primaries, stating which RGB basis functions are used.

The DXVA_VideoLighting enum describes the intended viewing lighting conditions. These can be used to alter the gamma to generate a comparable experience in a different lighting condition.

The DXVA_VideoTransferMatrix enum describes the conversion matrix from Y'Cb'Cr' to (studio) R'G'B'.

The DXVA_VideoChromaSubsampling enum describes the chroma encoding scheme for Y'Cb'Cr' data. The 'cosite' variations indicate that the chroma samples are aligned with the luma samples.

The DXVA_NominalRange enum describes whether the data includes headroom (values beyond 1.0 white) and toeroom (superblacks below the reference 0.0 black). It is useful to differentiate wide gamut R'G'B' (blackpoint at 16, 16, 16, whitepoint at 235, 235, 235) verses normal sRGB.

As mentioned above, the following three flags indicate whether the driver 420 is equipped to process certain features of the above-identified extended color functionality:

DXVA_VideoProcess_SubStreamsExtended;
DXVA_VideoProcess_YUV2RGBExtended; and
DXVA_VideoProcess_AlphaBlendExtended.

Support for the DXVA_VideoProcess_SubStreamsExtended flag indicates that the driver can perform the color adjustments to the source video and sub-streams, indicated in the extended color data parameter, as the video is de-interlaced, composited with the sub-streams, and written to the destination surface. Support for the DXVA_VideoProcess_YUV2RGBExtended flag indicates that the driver is capable of performing a color space conversion operation as the de-interlaced and composited pixels are written to the destination surface using the extended color information that is specified for the source and destination surfaces. Support for the DXVA_VideoProcess_AlphaBlendExtended flag indicates that the driver is capable of performing an alpha blend operation with the destination surface when the de-interlaced and composited pixels are written to the destination surface.

Exemplary DDI Mapping for the De-Interlace Interface

According to one exemplary implementation, the DeinterlaceBltEx method maps directly to a RenderMoComp method of the DD_MOTIONCOMPCALLBACKS structure. More specifically, RenderMoComp and DD_MOTIONCOMPCALLBACKS are part of the Device Driver Interface (DDI) between the Microsoft Windows DirectDraw component and the Graphics Device Driver. That is, DD_MOTIONCOMPCALLBACKS is the name of a data structure that contains a table of function pointers and RenderMoComp is one of the functions in the table. When a user calls the DeinterlaceBltEx function it is mapped into a call to the RenderMoComp function in the graphics driver. Different mappings are used for different operating systems. The exemplary mapping described herein is specific to the Windows® operating system, but the principles described herein can be applied to other operating environments.

In the mapping: a) dwNumBuffers is 1+ the number of source surfaces; b) lpBufferInfo points to an array of surfaces (where the first surface is the destination surface, and the remaining surfaces are the source surfaces); c) dwFunction is defined as DXVA_DeinterlaceBltExFnCode; lpInputData points to the following exemplary structure:

```
#define MAX_DEINTERLACE_INPUT_SURFACES 32
typedef struct _DXVA_DeinterlaceBltEx {
    DWORD              Size;
    DXVA_AYUVsample2   BackgroundColor;
    RECT               rcTarget;
    REFERENCE_TIME     rtTarget;
    DWORD              NumSourceSurfaces;
    FLOAT              Alpha;
    DXVA_VideoSample2  Source[MAX_DEINTERLACE_
                              SURFACES];
    DWORD              DestinationFormat;
    DWORD              DestinationFlags;
} DXVA_DeinterlaceBltEx;
``` and d) lpOutputData is NULL. In one exemplary implementation, for the DX-VA device used for de-interlacing, RenderMoComp will be called without calling BeginMoCompFrame or EndMoCompFrame.

In the above structure, the lpBufferInfo parameter points to an array of surfaces. In one exemplary implementation, the order of the surfaces within the array obeys the following rules. The first surface in the array is the Destination surface; this is the only surface in the array that should be written too. The next sequence of surfaces in the array would be any previous destination surfaces, in reverse temporal order, that the de-interlacing device requested for it's de-interlace algorithm. The next sequence of surfaces in the array is a collection of input interlaced or progressive surfaces that the device needs in order to perform it's de-interlace operation. The next sequence of surfaces in the array is the video sub-stream surfaces, these surfaces being in Z order.

The following exemplary sample code below shows how the driver can map the RenderMoComp DDI call into calls to DeinterlaceBltEx. The sample code only shows how the RenderMoComp function is used for de-interlacing. If the driver supports other DX-VA functions, such as decoding MPEG-2 video streams, then the sample code can be extended to include processing of additional DX-VA GUIDs.

```
DWORD APIENTRY
RenderMoComp(
    PDD_RENDERMOCOMPDATA lpData
    )
{
    LPDXVA_DeinterlaceStream pDXVAState =
        (LPDXVA_DeinterlaceStream)lpData->lpMoComp->
        lpDriverReserved1;
    DXVA_DeinterlaceBltEx* lpBlt =
        (DXVA_DeinterlaceBltEx*)lpData->lpInputData;
    LPDDMOCOMPBUFFERINFO lpBuffInfo = lpData->BufferInfo;
    for (DWORD i = 0; i < lpBlt->NumSourceSurfaces; i++) {
        lpBlt->Source[i].lpDDSSrcSurface =
                               lpBuffInfo[1 + i].lpCompSurface;
    }
```

```
    lpData->ddRVal = DeinterlaceBltEx(pDXVAState,
                                      lpBlt->rtTarget,
                                      &lpBlt->rcTarget,
                                      lpBlt->BackgroundColor,
                                      lpBlt->DestinationFormat,
                                      lpBlt->DestinationFlags,
                                      lpBuffInfo[0].lpCompSurface,
                                      &lpBlt->Source,
                                      lpBlt->NumSourceSurfaces,
                                      lpBlt->Alpha);
    return DDHAL_DRIVER_HANDLED;
}
```

D. Exemplary Computer Environment

FIG. 14 illustrates one example of a computing environment 1400 within which the above-described video processing can be either fully or partially implemented. The computing environment 1400 includes the general purpose computer 1402 and the display device 432 (discussed in the context of FIG. 4). However, the computing environment 1400 can include other kinds of computer and network architectures. For example, although not shown, the computer environment 1400 can include hand-held or laptop devices, set top boxes, programmable consumer electronics, mainframe computers, gaming consoles, etc. Further, FIG. 14 shows elements of the computer environment 1400 grouped together to facilitate discussion. However, the computing environment 1400 can employ a distributed processing configuration. In a distributed computing environment, computing resources can be physically dispersed throughout the environment.

Exemplary computer 1402 includes one or more processors or processing units 1404, a system memory 1406, and a bus 1408. The bus 1408 connects various system components together. For instance, the bus 1408 connects the processor 1404 to the system memory 1406. The bus 1408 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1402 can also include a variety of computer readable media, including a variety of types of volatile and non-volatile media, each of which can be removable or non-removable. For example, system memory 1406 includes computer readable media in the form of volatile memory, such as random access memory (RAM) 1410, and non-volatile memory, such as read only memory (ROM) 1412. ROM 1412 includes an input/output system (BIOS) 1414 that contains the basic routines that help to transfer information between elements within computer 1402, such as during start-up. RAM 1410 typically contains data and/or program modules in a form that can be quickly accessed by processing unit 1404.

Other kinds of computer storage media include a hard disk drive 1416 for reading from and writing to a non-removable, non-volatile magnetic media, a magnetic disk drive 1418 for reading from and writing to a removable, non-volatile magnetic disk 1420 (e.g., a "floppy disk"), and an optical disk drive 1422 for reading from and/or writing to a removable, non-volatile optical disk 1424 such as a CD-ROM, DVD-ROM, or other optical media. The hard disk drive 1416, magnetic disk drive 1418, and optical disk drive 1422 are each connected to the system bus 1408 by one or more data media interfaces 1426. Alternatively, the hard disk drive 1416, magnetic disk drive 1418, and optical disk drive 1422 can be connected to the system bus 1408 by a SCSI interface (not shown), or other coupling mechanism. Although not shown, the computer 1402 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1402. For instance, the readable media can store the operating system 1428, one or more application programs 1430, other program modules 1432, and program data 1434.

The computer environment 1400 can include a variety of input devices. For instance, the computer environment 1400 includes the keyboard 1436 and a pointing device 1438 (e.g., a "mouse") for entering commands and information into computer 1402. The computer environment 1400 can include other input devices (not illustrated), such as a microphone, joystick, game pad, satellite dish, serial port, scanner, card reading devices, digital or video camera, etc. Input/output interfaces 1439 couple the input devices to the processing unit 1404. More generally, input devices can be coupled to the computer 1402 through any kind of interface and bus structures, such as a parallel port, serial port, game port, universal serial bus (USB) port, etc.

The computer environment 1400 also includes the display device 432. Functionality 1440 generally represents the vertically disposed elements shown in FIG. 4, for example, renderer 416, graphics interface 418, display driver 420, graphics processor 422, and so on. In addition to the display device 432, the computer environment 1400 can include other output peripheral devices, such as speakers (not shown), a printer (not shown), etc.

Computer 1402 can operate in a networked environment using logical connections to one or more remote computers, such as a remote computing device 1442. The remote computing device 1442 can comprise any kind of computer equipment, including a general purpose personal computer, portable computer, a server, a router, a network computer, a peer device or other common network node, etc. Remote computing device 1442 can include all of the features discussed above with respect to computer 1402, or some subset thereof.

Any type of network can be used to couple the computer 1402 with remote computing device 1442, such as a local area network (LAN) 1444, or a wide area network (WAN) 1446 (such as the Internet). When implemented in a LAN networking environment, the computer 1402 connects to local network 1444 via a network interface or adapter 1448. When implemented in a WAN networking environment, the computer 1402 can connect to the WAN 1446 via a modem 1450 or other connection strategy. The modem 1450 can be located internal or external to computer 1402, and can be connected to the bus 1408 via serial I/O interfaces 1452 other appropriate coupling mechanism. Although not illustrated, the computing environment 1400 can provide wireless communication functionality for connecting computer 1402 with remote computing device 1442 (e.g., via modulated radio signals, modulated infrared signals, etc.).

In a networked environment, the computer 1402 can draw from program modules stored in a remote memory storage device 1454. Generally, the depiction of program modules as discrete blocks in FIG. 14 serves only to facilitate discussion; in actuality, the programs modules can be distributed over the computing environment 1400, and this distribution can change in a dynamic fashion as the modules are executed by the processing unit 1404.

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for processing video data in an apparatus including a computer processing module and a graphics processing module, comprising:

receiving a principal video stream from a source via plural inputs to the graphics processing module, the plural inputs associated with respective components of the principal video stream;

receiving a video sub-stream containing supplemental information associated with the principal video stream via another input to the graphical processing module;

in a single stage operation, performing, by the graphics processing module, an operation on the principal video stream and combining the principal video stream with the video sub-stream to produce processed data, wherein the single stage operation requires only a single read transaction to perform the single stage operation; and outputting the processed data, wherein each of the plural inputs for receiving the principal video stream and the other input for receiving the video sub-stream refer to separate inputs, and wherein the graphics processing module executes video processing tasks using a 3D graphics pipeline.

2. The method according to claim 1, wherein the performing of the operation comprises de-interlacing the principal video stream.

3. The method according to claim 1, wherein the performing of the operation comprises resizing the principal video stream.

4. The method according to claim 1, wherein the performing and the is combining are performed in a YUV color space.

5. The method according to claim 1, further including a step of forwarding instructions to the graphics processing module, the instructions informing the graphics processing module how to execute the performing and the combining.

6. The method according to claim 5, wherein the instructions identify a location at which to receive the principal video stream, a location at which to receive the video sub-stream, and a location at which to provide the processed data.

7. The method according to claim 6, wherein the instructions identify a rectangle of data from which to receive the principal video stream within a video stream surface, a rectangle of data from which to receive the video sub-stream within a video sub-stream surface, and a rectangle at which to output the processed data within a destination surface.

8. The method according to claim 1, wherein the video sub-stream includes at least one of: close captioned information; DVD sub-picture information; or PAL teletext information.

9. The method according to claim 1, wherein the performing and the combining are performed on an apparatus that uses a Uniform Memory Architecture (UMA) design.

10. The method of claim 1, wherein the single stage operation includes only one read transaction.

11. The method of claim 10, wherein the single stage operation includes only one write transaction.

12. The method of claim 1, wherein the graphics processing module includes multiple texturing units associated with the plural inputs and the other input.

13. An apparatus for processing video data, comprising:
a computer processing module for controlling the apparatus;
a renderer module;
a graphics processing module; and
an interface module that couples the renderer module to the data processing module,
wherein the renderer module includes logic configured to generate and provide instructions to the graphics processing module to execute at least the following functions in a single stage:
　a) performing an operation on a principal video stream received via plural inputs to the graphics processing module, the plural inputs associated with respective components of the principal video stream; and
　b) combining the received principal video stream with a video sub-stream, wherein the video sub-stream is received via another input to the graphics processing module,
wherein the single stage operation requires only a single read transaction to perform the single stage operation,
wherein each of the plural inputs for receiving the principal video stream and the other input for receiving the video sub-stream refer to separate inputs, and
wherein the graphics processing module is configured to execute video processing tasks using a 3D graphics pipeline.

14. An apparatus according to claim 13, wherein the performing of the operation comprises de-interlacing the principal video stream.

15. An apparatus according to claim 13, wherein the performing of the operation comprises resizing the principal video stream.

16. The apparatus according to claim 13, wherein the performing and the combining are performed in a YUV color space.

17. The apparatus according to claim 13, wherein the instructions provided by the renderer module inform the graphics processing module how to execute the performing and the combining.

18. The apparatus according to claim 17, wherein the instructions identify a location at which to receive the principal video stream, a location at which to receive the video sub-stream, and a location at which to provide the processed data.

19. The apparatus according to claim 18, wherein the instructions identify a rectangle of data from which to receive the principal video stream within a video stream surface, a rectangle of data from which to receive the video sub-stream within a video sub-stream surface, and a rectangle at which to output the processed data within a destination surface.

20. The apparatus according to claim 13, wherein the video sub-stream includes at least one of: close captioned information; DVD sub-picture information; or PAL teletext information.

21. The apparatus according to claim 13, wherein the apparatus is configured to operate using a Uniform Memory Architecture (UMA) design.

22. The apparatus according to claim 13, wherein the graphics processing module includes multiple texturing units associated with the plural inputs and the other input.

23. The apparatus according to claim 22, wherein the graphics processing module is configured to execute the performing and the combining in a single stage by reading video data associated with the multiple texturing units at the same time.

24. An apparatus for processing video data, comprising:
a memory;
a computer processing module for controlling the apparatus, the computer processing module being coupled to the memory;
a renderer module;
a graphics processing module coupled to same memory as the computer processing module; and
an interface module that couples the renderer module to the graphics processing module,
wherein the renderer module includes logic configured to generate and provide instructions to the graphics processing module to execute at least the following functions in a single stage:
　a) performing an operation on a principal video stream received via plural inputs to the graphics processing module, the plural inputs associated with respective components of the principal video stream; and
　b) combining the received principal video stream with a video sub-stream, wherein the video sub-stream is received via another input to the graphics processing module,
wherein the graphics processing module includes logic configured to receive the instructions provided by the renderer module, and in response thereto, execute the performing and the combining,
wherein the single stage operation requires only a single read transaction to perform the single stage operation,
wherein each of the plural inputs for receiving the principal video stream and the other input for receiving the video sub-stream refer to separate inputs, and
wherein the graphics processing module is configured to execute video processing tasks using a 3D graphics pipeline.

25. The apparatus of claim 24, wherein the graphics processing module includes multiple texturing units associated with the plural inputs and the other input.

26. An apparatus for processing video data, comprising:
computer processing means for controlling the apparatus;
graphical processing means for performing graphical processing tasks, comprising:
　means for receiving a principal video stream from a source via plural inputs to the graphical processing means, the plural inputs associated with respective components of the principal video stream;
　means for receiving a video sub-stream containing supplemental information associated with the principal video stream via another input to the graphical processing means;
　means, in a single stage operation, for performing an operation on the principal video stream and combining the principal video stream with the video sub-stream to produce processed data, wherein the single stage operation requires only a single read transaction to perform the single stage operation; and
　means for outputting the processed data, wherein each of the plural inputs for receiving the principal video stream and the other input for receiving the video sub-stream refer to separate inputs, and wherein the graphics processing means is configured to execute video processing tasks using a 3D graphics pipeline.

27. The apparatus of claim 26, wherein the graphics processing means includes multiple texturing units associated with the plural inputs and the other input.

28. A computer readable media having machine readable instructions stored thereon for use by an apparatus including a computer processing module and a graphics processing module, the instructions comprising:

logic associated with the graphics processing module configured to receive a principal video stream from a source via plural inputs of the graphical processing module, the plural inputs associated with respective components to the principal video stream;

logic associated with the graphics processing module configured to receive a video sub-stream containing supplemental information associated with the principal video stream via another input to the graphical processing module;

logic associated with the graphics processing module configured to, in a single stage operation, perform an operation on the principal video stream and combine the principal video stream with the video sub-stream to produce processed data, wherein the single stage operation requires only a single read transaction to perform the single stage operation; and logic configured to output the processed data, wherein each of the plural inputs for receiving the principal video stream and the other input for receiving the video sub-stream refer to separate inputs, and wherein the graphics processing module is configured to execute video processing tasks using a 3D graphics pipeline.

29. The computer readable media of claim 28, wherein the graphics processing module includes multiple texturing units associated with the plural inputs and the other input.

30. A method for processing video data using a graphics processing module, comprising:

receiving a principal video stream from a source via plural inputs to the graphics processing module, the plural inputs associated with respective components of the principal video stream;

receiving a video sub-stream containing supplemental information associated with the principal video stream via another input to the graphics processing module;

in a single stage operation, performing an operation on the principal video stream and combining the principal video stream with the video sub-stream to produce processed data, wherein the single stage operation involves reading first input data associated with the received principal video stream in parallel with second input data associated with the received video sub-stream data; and outputting the processed data, wherein each of the plural inputs for receiving the principal video stream and the other input for receiving the video sub-stream refer to separate inputs, and wherein the graphics processing module executes video processing tasks using a 3D graphics pipeline.

31. The method of claim 30, wherein the graphics processing module includes multiple texturing units associated with the plural inputs and the other input.

* * * * *